United States Patent [19]

(12) United States Patent
Kraeling

(10) Patent No.: US 9,120,490 B2
(45) Date of Patent: Sep. 1, 2015

(54) SYSTEM AND METHOD FOR VEHICLE OPERATION

(71) Applicant: General Electric Company, Schenectady, NY (US)

(72) Inventor: Mark Bradshaw Kraeling, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 53 days.

(21) Appl. No.: 14/149,863

(22) Filed: Jan. 8, 2014

(65) Prior Publication Data

US 2015/0073629 A1    Mar. 12, 2015

Related U.S. Application Data

(60) Provisional application No. 61/875,247, filed on Sep. 9, 2013.

(51) Int. Cl.
*G05D 1/00* (2006.01)
*B61C 17/02* (2006.01)
*G06F 13/38* (2006.01)
*F17D 3/01* (2006.01)

(52) U.S. Cl.
CPC . *B61C 17/02* (2013.01); *F17D 3/01* (2013.01); *G06F 13/38* (2013.01)

(58) Field of Classification Search
CPC ..... B61L 3/006; B61L 15/0027; H04L 65/60; B60L 2200/26; B61C 7/04; Y02T 30/16
USPC ........................................................... 701/19
See application file for complete search history.

(56) References Cited

U.S. PATENT DOCUMENTS

| | | | |
|---|---|---|---|
| 6,314,466 B1 * | 11/2001 | Agarwal et al. | 709/231 |
| 6,339,785 B1 * | 1/2002 | Feigenbaum | 709/213 |
| 8,655,515 B2 * | 2/2014 | Noffsinger et al. | 701/19 |
| 2007/0272116 A1 * | 11/2007 | Bartley et al. | 105/35 |
| 2010/0070116 A1 * | 3/2010 | Kumar et al. | 701/19 |
| 2010/0131127 A1 * | 5/2010 | DeSanzo | 701/19 |
| 2010/0168942 A1 * | 7/2010 | Noffsinger et al. | 701/21 |
| 2010/0174484 A1 * | 7/2010 | Sivasubramaniam et al. | 701/213 |
| 2011/0186692 A1 * | 8/2011 | Kumar et al. | 246/29 R |
| 2012/0078454 A1 * | 3/2012 | Kumar | 701/19 |
| 2012/0245766 A1 * | 9/2012 | Cooper et al. | 701/2 |
| 2012/0290157 A1 * | 11/2012 | Siddappa et al. | 701/20 |

* cited by examiner

*Primary Examiner* — Hussein A. Elchanti
(74) *Attorney, Agent, or Firm* — GE Global Patent Operation; John A. Kramer

(57) ABSTRACT

A system, in a vehicle consist including at least a fuel car operably connectable to a powered vehicle via a fuel distribution path, includes a communication module and a determination module. The communication module is configured to communicate via a first channel and a second channel. The second channel is associated with the fuel distribution path and is configured to communicate a status signal. The determination module is configured to associate the fuel distribution path with the powered vehicle based at least in part on at least one of the status signal or an acknowledgment message indicating receipt of the status signal.

10 Claims, 8 Drawing Sheets

SYSTEM AND METHOD FOR VEHICLE OPERATION

CROSS-REFERENCE TO RELATED APPLICATIONS

This application claims priority to U.S. provisional application No. 61/875,247, filed 9 Sep. 2013, hereby incorporated by reference.

FIELD

Embodiments of the subject matter described herein relate to the identification of a position and/or orientation of one or more powered vehicles relative to a fuel supply vehicle.

BACKGROUND

A vehicle system may include one or more powered vehicles that may be mechanically linked (directly or indirectly) to non-powered vehicles. The powered and non-powered vehicles of the vehicle system may travel as a group along a designated route. In cases where the vehicle system includes multiple powered vehicles, the vehicle system may coordinate operations of the powered vehicles to move the vehicle system. For example, a rail vehicle system may include a powered unit consist that has one or more powered units mechanically coupled to one or more non-powered rail cars. Vehicles in a consist may include a lead powered unit and one or more remote powered units and/or trail powered units. (Remote powered units are those that are spaced apart from the lead powered unit by one or more non-powered vehicles. Trail powered units are those that are in the same powered unit consist as the lead powered unit, and thereby not spaced apart from the lead powered unit by one or more non-powered rail vehicles, but that are subordinate to control by the lead powered unit). The lead vehicle may control operation of one or more remote vehicles.

In certain vehicle systems, a lead vehicle communicates with remote powered vehicles via a multiple unit (MU) line. Conventional MU communications do not identify a particular remote vehicle for which a command is intended. Instead, a similar command is sent to all remote vehicles. Ethernet over MU signals may be overlaid on one or more channels of a MU line, and may include identification information of a sender or intended audience. However, such identification information may only be useful when a receiving vehicle has previous knowledge of the identity or location of a sender.

In certain vehicle systems, fuel cars (also known as fuel tenders) may be employed to carry fuel and to supply fuel to one or more powered vehicles. For example, liquid natural gas (LNG) or compressed natural gas (CNG) may be employed as a fuel source for one or more powered vehicles. However, LNG and CNG may not be readily available along a route traversed during a mission. Thus, fuel cars may be added to a consist to provide additional fuel carrying capability. Further, fuel cars may be replaced and/or added at various points during performance of a mission to provide additional fuel. As powered vehicles consume fuel during a mission, those vehicles that require additional fuel may request fuel from a fuel car. A fuel car may be operably connected with plural vehicles, for example, via separate, dedicated fuel supply lines. For proper response to fuel requests, the fuel car must be able to determine which fuel supply line provides fuel to a particular vehicle requesting fuel. Because communications utilizing MU or Ethernet over MU communications may be configured so that all vehicles have access to messages, it may be difficult to determine which vehicle is requesting fuel. It may be desirable to have a system or method that differs from those that are currently available.

BRIEF DESCRIPTION

In an embodiment a system is provided that includes a communication module and a determination module in a vehicle consist including at least a fuel car operably connectable to a powered vehicle via a fuel distribution path. As used herein, the terms "system" and "module" may include circuitry, including a hardware and/or software system that operates to perform one or more functions. For example, a module or system may include a computer processor, controller, or other logic-based device that performs operations based on instructions stored on a tangible and non-transitory computer readable storage medium, such as a computer memory. Alternatively, a module or system may include a hard-wired device that performs operations based on hard-wired logic of the device. The modules shown in the attached figures may represent the hardware that operates based on software or hard-wired instructions, the software that directs hardware to perform the operations, or a combination thereof.

The communication module is configured to communicate via a first channel and second channel. The second channel is associated with the fuel distribution path and is configured to communicate a status signal. The determination module is configured to associate the fuel distribution path with the powered vehicle based at least in part on at least one of the status signal or an acknowledgement message indicating receipt of the status signal.

In an embodiment a method, for a system having a first channel configured to transmit data, and a second channel associated with a fuel distribution path from a fuel car to a powered vehicle that is operatively coupled to the fuel car, includes transmitting a status signal over the second channel. The method also includes associating the fuel distribution path via the status signal with the powered vehicle and the fuel car.

In an embodiment, a controller is configured to direct one or more processors to transmit an announcement message over a first channel. The announcement message is communicated between a fuel car of a vehicle consist and plural additional vehicles of the vehicle consist. The announcement message is configured to announce a status signal. The first channel is configured for communications with the plural additional vehicles and the fuel car. One or more messages transmitted by a given vehicle over the first channel is received by each other vehicle operably connected to the first channel. The controller is also configured to direct the one or more processors to transmit the status signal over a second channel. The second channel is associated with at least one fuel distribution path from the fuel car. The controller is also configured to direct the one or more processors to determine at least one of a source of the status signal or a source of an acknowledgement message transmitted responsive to the status signal. Also, the controller is configured to direct the one or more processors to associate the at least one fuel distribution path associated with the second channel with the at least one of the source of the status signal or the source of the acknowledgement message.

BRIEF DESCRIPTION OF THE DRAWINGS

The inventive subject matter will be better understood from reading the following description of non-limiting embodiments, with reference to the attached drawings, wherein below.

DETAILED DESCRIPTION

Figure 1:
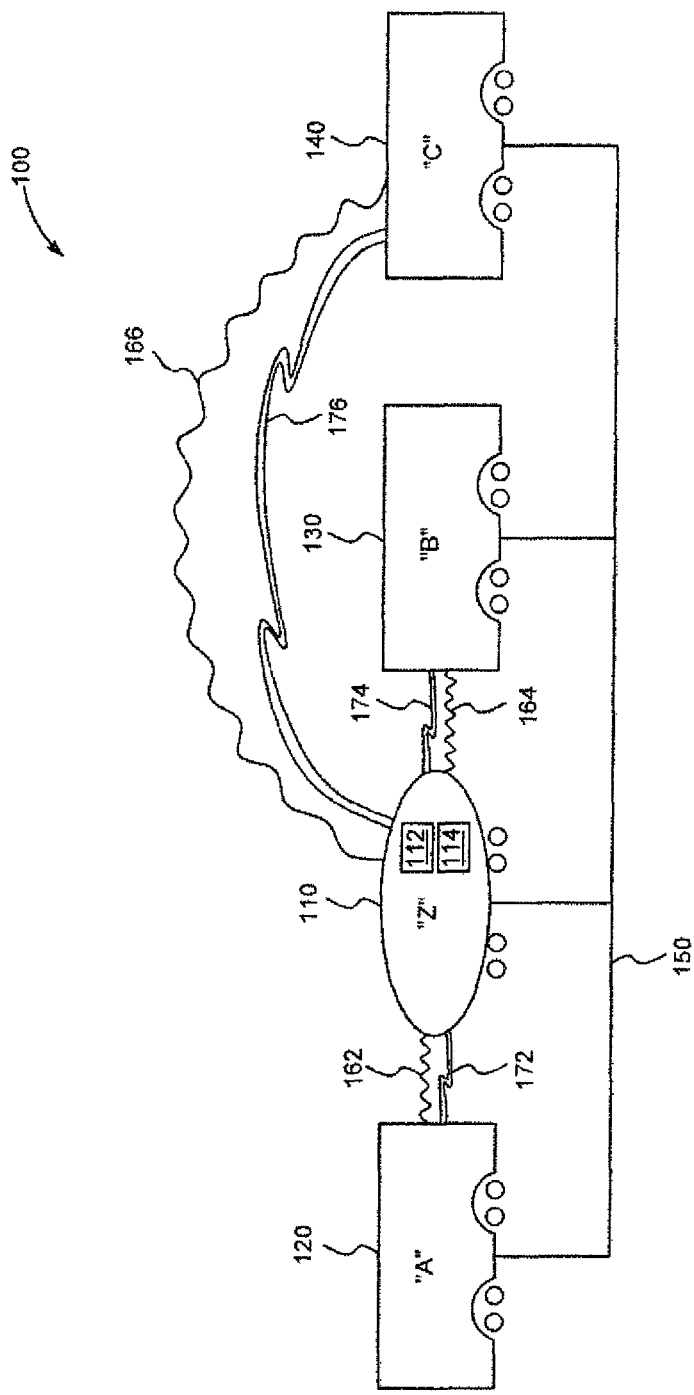
FIG. 1 is a schematic diagram of a vehicle system, according to an embodiment.

Embodiments of the subject matter described herein relate to the identification of a position and/or orientation of one or more powered vehicles relative to a fuel supply vehicle. Throughout this document, a vehicle consist may be a group of two or more vehicles that are coupled to travel together along a route. Optionally, a vehicle consist may have a single propulsion-generating unit or vehicle. The vehicles in a vehicle consist can be propulsion-generating units (e.g., vehicles capable of generating propulsive force, which also are referred to as propulsion-generating units, powered units, or powered vehicles) that may be in succession and connected together so as to provide motoring and/or braking capability for the vehicle consist. The propulsion-generating units may be connected together with or without other vehicles or cars between the propulsion-generating units. One example of a vehicle consist is a locomotive consist that includes locomotives as the propulsion-generating units. Other vehicles may be used instead of or in addition to locomotives to form the vehicle consist. A vehicle consist can also include non-propulsion generating units, such as where two or more propulsion-generating units are connected with each other by a non-propulsion-generating unit, such as a rail car, passenger car, or other vehicle that cannot generate propulsive force to propel the vehicle consist. A larger vehicle consist, such as a train, can have sub-consists. Specifically, there can be a lead consist (of propulsion-generating units), and one or more remote consists (of propulsion-generating units), such as midway in a line of cars and another remote consist at the end of the train.

The vehicle consist may have a lead propulsion-generating unit and a trail or remote propulsion-generating unit. The terms "lead," "trail," and "remote" are used to indicate which of the propulsion-generating units control operations of other propulsion-generating units, and which propulsion-generating units are controlled by other propulsion-generating units, regardless of locations within the vehicle consist. For example, a lead propulsion-generating unit can control the operations of the trail or remote propulsion-generating units, even though the lead propulsion-generating unit may or may not be disposed at a front or leading end of the vehicle consist along a direction of travel. A vehicle consist can be configured for distributed power operation, wherein throttle and braking commands are relayed from the lead propulsion-generating unit to the remote propulsion-generating units by a radio link or physical cable. Toward this end, the term vehicle consist should be not be considered a limiting factor when discussing multiple propulsion-generating units within the same vehicle consist.

A vehicle system may include one or more powered vehicles (or powered units) and one or more non-powered vehicles (or non-powered units). In certain embodiments, the vehicle system is a rail vehicle system that includes one or more locomotives and, optionally, one or more rail cars. In other embodiments, however, the vehicle system may include non-rail type vehicles, including off-highway vehicles (e.g., vehicles that are not designed or allowed by law or regulation to travel on public roads, highways, and the like), automobiles, marine vessels, and the like. In some cases, at least a plurality of the vehicles in a vehicle system may each include a separate vehicle network.

One or more embodiments of the inventive subject matter described herein provide methods and systems for associating powered vehicles with a fuel car configured to supply the powered vehicles, and/or associating fuel distribution paths linking one or more powered vehicles with the fuel car. The vehicle system may include a plurality of vehicles that are mechanically coupled or linked together (directly or indirectly) and communicatively coupled to each other. A first channel may communicatively link all of the vehicles or a group of the vehicles of a consist, while a status channel may link the fuel car exclusively with one or more vehicles supplied by a particular fuel distribution path corresponding to the status channel. Status signals sent over the status channel may be utilized to identify which particular powered vehicles are supplied by which particular fuel distribution paths.

Conventional multiple unit (MU) cable connections between powered rail vehicles carry signals for throttle, dynamic brake, direction, and the like. However, such communication systems do not include information identifying a particular vehicle as an intended recipient of a message or the source of a message. Instead, identical commands are sent to all vehicles of a consist, and status messages are received without identifying the particular originating vehicle. Various embodiments add a second communication path (e.g., by overlaying a digital MU path over one or more wires of a MU cable, such as Ethernet over MU) that provides for messages to be specific for a given vehicle. Such messages may include a sequence number or a time stamp indicating that the message is the most recent received (or indicating when a message was received).

At least one technical effect of various embodiments described herein may include improved accuracy in identification of a fuel distribution path to be used to supply a requesting vehicle with fuel. Another technical effect may include improved identification of a particular vehicle or vehicles to which a message (e.g., status message, request message, command message) corresponds. Another technical effect may include automatic updating of fuel distribution information responsive to the addition or removal of vehicles from a consist. Another technical effect may include improved communication and control of fuel cars and distribution of fuel. Another technical effect may include improved safety and/or efficiency of fuel distribution.

FIG. 1 is a schematic view of a vehicle system 100 formed in accordance with various embodiments. The depicted vehicle system 100 of FIG. 1 includes a fuel car 110 (also known as a fuel tender), a first powered rail vehicle 120, a second powered rail vehicle 130, and a third powered rail vehicle 140. It should be noted that other arrangements of vehicles in the vehicle system 100 may be contemplated in various embodiments. For example, additional and/or different types of rail vehicles or units may be employed in different embodiments. As one example, the vehicle system 100 may include (or form a portion of) a larger consist including additional powered vehicles, fuel cars, and/or other non-powered vehicles. The vehicles 120, 130, 140 in the illustrated embodiment are configured as propulsion-generating vehicles. For example, the first powered vehicle 120 may be the lead powered unit of a consist, and the second powered vehicle 130 and the third powered vehicle 140 may be remote powered units of a consist. The vehicles 120, 130, 140 are configured as rail vehicles, such as powered rail vehicles or locomotives, in the illustrated embodiment; however, in alternate embodiments, different types of vehicles may be employed. Messages or commands from the lead powered unit may be transmitted to a remote powered unit to control one or more operations of the remote powered unit. In the illustrated embodiment, the lead powered unit is depicted at a front end of the consist; however, in some embodiments, the lead powered unit need not necessarily be disposed at a leading end of the consist.

The fuel car may hold fuel for use by the powered rail vehicles 120, 130, 140. As one example, the fuel car may be configured to contain liquid natural gas (LNG) for distribution to one or more of the powered rail vehicles 120, 130, 140 during performance of a mission or trip. As another example, the fuel car may be configured to contain compressed natural gas (CNG). As another example, the fuel car may be configured to contain LNG, which is converted on board the fuel car to CNG for distribution to one or more of the powered rail vehicles. In other embodiments, additional or different fuels may be used.

The fuel car is operably connected to the powered rail vehicles via one or more fuel distribution paths. The fuel distribution paths may include one or more of piping, hosing, or other conduit configured for passage therethrough of fuel from the fuel car. The fuel distribution paths may also include valves, governors, fittings, or the like. In some embodiments, each particular powered vehicle is connected to a particular fuel car via a dedicated fuel distribution path configured for distribution of fuel from the fuel car to only that particular powered vehicle. Alternatively or additionally, in various embodiments, at least a portion of a fuel distribution path may be shared by more than one powered rail vehicle.

In the illustrated embodiment, each of the powered rail vehicles 120, 130, 140 is operably coupled to the fuel car via a dedicated fuel distribution path that supplies fuel from the fuel car to that particular vehicle. The fuel car and the first powered rail vehicle 120 are operably coupled by a first fuel distribution path 172. The fuel car and the second powered rail vehicle 130 are operably coupled by a second fuel distribution path 174. The fuel car and the third powered rail vehicle 140 are operably coupled by a third fuel distribution path 176.

Each of the fuel car and the first powered rail vehicle, second powered rail vehicle, and third powered rail vehicle are communicably coupled with each of the others via a first channel 150. The first channel may be a main or primary communication channel or an operations communication channel, as the first channel is configured for, among other things, transmission of signals or messages regarding the control or operation of various aspects of the fuel system and/or vehicle system during performance of a mission or trip. The first channel may be in a spoke and hub configuration, a ring configuration or, as illustrated, a star configuration. In a star configuration each node (e.g., each of the vehicles' communication systems) has access to signals, messages, or other communications transmitted via the first communication channel. In the illustrated embodiment, each message or signal transmitted from any given depicted vehicle is received by each other depicted vehicle. Because each vehicle receives communications sent from each other vehicle, the mere receipt of a message may not be sufficient, on its own, to determine the location, position, or orientation of the vehicle sending the message relative to the vehicle receiving the message. Suitable communication outlays for the first channel may include Ethernet over MU communications that provide for messages to be tailored for a given vehicle or vehicles, for example by including one or more addresses or other identifiers in a header or as a protocol entry. However, even if the identity of the sender and/or intended recipient may be identified by an address or other identifier (e.g., in a header of the message), the recipient may then only be able to determine the identity of the sender, but not the location of the sender, nor be able to identify a particular fuel distribution path associated with the sender.

To determine position and/or to identify an associated fuel distribution path with only the identity of the sender known may require a time consuming and error prone set-up process, with the relative positions of the various vehicles entered and stored at each vehicle, for example, each time vehicles are joined or removed from a vehicle system. Drawbacks (time required, potential for entry errors, computing resources required, or the like) of such a procedure may be exacerbated for fuel cars, as fuel cars generally have less computing resources (and associated costs) associated therewith, and/or as fuel cars may be more frequently replaced during a trip or mission. Thus, each time one or more fuel cars are added to or removed from a vehicle system (e.g., consist), a time consuming and error prone procedure for manually entering positions of each vehicle may be required.

Embodiments provide second channels for improved determination of position, eliminating or reducing the need for manual or other entry of relative positions of vehicles with respect to one or more fuel cars. The second channels may be understood as status channels, as the second channels are configured for communicating status signals, such as test signals or diagnostic signals. In various embodiments, a fuel distribution path has a corresponding second or status channel associated therewith, while in other embodiments a second or status channel may be shared by more than one powered rail vehicle (e.g., a given second or status channel may communicably couple a fuel car with plural powered rail vehicles positioned on a first side of the fuel car, and a different second or status channel may communicably couple the fuel car with one or more powered rail vehicles positioned on an opposite side of the fuel car). Thus, in some embodiments, the cars or vehicles communicably coupled by a given status channel form a small subset of the cars or vehicles communicating through the first channel. In some embodiments, the first channel may be configured to provide messages corresponding to the sender (e.g., identification information), while one or more status channels may not provide such messages, with messages transmitted over the one or more status channels not containing information identifying the sender within the message.

In the illustrated embodiment, the vehicle system 100 includes a first status channel 162 communicably coupling the first powered rail vehicle with the fuel car, a second status channel 164 communicably coupling the second powered rail vehicle with the fuel car, and a third status channel 166 communicably coupling the third powered rail vehicle with the fuel car. Each status channel in the illustrated embodiment is also dedicated to a particular fuel delivery path, such that each status channel communicably couples the fuel car to a corresponding powered rail vehicle for which a particular fuel delivery path is configured to provide fuel, and does not communicably couple the fuel car to any other powered rail vehicle. Thus, in various embodiments, by determining which vehicle or vehicles are communicably coupled by a given status channel, it may be determined which fuel distribution path couples the fuel car with which vehicle.

In the illustrated embodiment, the first status channel is associated with the first fuel distribution path, the second status channel 164 is associated with the second fuel distribution path, and the third status channel 166 is associated with the third fuel distribution path. Thus, by identifying which powered rail vehicle receives (or sends) a status message via the first status channel, it may be determined which particular powered rail vehicle is coupled to the fuel car via the first fluid distribution path, and that fuel may be supplied to that particular powered rail vehicle via the first fuel distribution path. A given status channel and fuel distribution path may be associated in one or more various ways. As one example, the status channel and fuel distribution path may be associated by a stored record, for example a database that tabulates corresponding status channels and fuel distribution paths. As another example, the status channel and fuel distribution path may be physically associated. For example, the status channel may comprise a wire and the fuel distribution path may comprise a hose. The wire may be routed adjacent, alongside, or otherwise proximate to the hose. In some embodiments, the wire may be clipped or tied to the hose. In various embodiments, the hose and wire may share a common mounting fitting or flange, such that the hose and wire may be joined to a give vehicle via a common coupling or connection.

In one example, the status channel and fuel distribution path may be associated by sharing a physical component. For example, in some embodiments, a status signal may be configured as pressure pulse sent via a fuel distribution line. Thus, the status signal may be sent and the fuel distributed through a common hose, pipe, or other conduit. In some embodiments, the first channel may include a multiple unit (MU) line configured for Ethernet over MU communication, and at least one fuel distribution path may be utilized as the second channel, with the communication module configured to transmit a pressure pulse along at least a portion of the at least one fuel distribution path. In one example, the status channel and the fuel distribution path may be associated by sharing paired components, such as each having a radio frequency infrared device (RFID) or equivalent with an associated identifier. In such an embodiment, an RFID tag mounted to a fuel line would be sensed by an RFID tag sensor in communication with the determining unit. During operation, plugging together the fuel hose would put the RFID tag in operative proximity with the RFID sensor to allow determination that at fuel distribution path was coupled to a determined fuel intake coupler on the powered vehicle.

In various embodiments, one or more status messages may be transmitted from the fuel car to one or more powered rail vehicles. Alternatively or additionally, one or more status messages may be transmitted from one or more powered rail vehicles to the fuel car. In some embodiments, the fuel car may transmit a status message (or messages) responsive to a request (or requests) from one or more powered rail vehicles. For example, the fuel car may announce, over the first channel such that each of the powered rail vehicles 120, 130, 140 receive the announcement, the transmission of a status signal sent over a second channel. The announcement and one or more status signals may be transmitted at one or more times or stages of a trip or mission. For example, the announcement and one or more status signals may be transmitted at the outset of a trip or mission, during a stop of a trip or mission, during a reconfiguration (e.g., removal or addition of one or more powered rail vehicles or fuel cars), or periodically (e.g., after expiration of a predetermined time interval).

Generally, the announcement message may be transmitted before or after the status message, so long as associated or identifiable therewith. For example, an announcement message transmitted over the first channel may include a header identifying the sender of a status message as "Vehicle Z" (the fuel car). In embodiments where the announcement is sent before the status, the powered rail vehicles may be configured to associate any status message received within a predetermined time after the announcement as coming from "Vehicle Z." Similarly, in embodiments where the announcement is sent after the status, the powered rail vehicles may be configured to associate any status message received within a predetermined time before the announcement as coming from "Vehicle Z." Thus, the announcement may be used by a powered rail vehicle to determine which fuel car the powered rail vehicle is supplied by. For example, if a powered rail vehicle receives an announcement message from "Vehicle Z" and receives an associated status message over a second channel (e.g., within a predetermined amount of time of the announcement message), the powered rail vehicle may determine that "Vehicle Z" is its fuel supply source. If after receiving one or more announcement messages from "Vehicle Z" and not receiving any status messages, the powered rail vehicle may determine that it is not supplied by "Vehicle Z." Instead, for example, the powered rail vehicle may later receive an announcement message and associated status message from a "Vehicle Y" and determine that it is supplied by "Vehicle Y." Alternatively, the rail vehicle may not receive a status message from any source, and determine that it is not supplied by any fuel car.

In various embodiments, each powered rail vehicle, 130, 140 may be configured to transmit, over the first channel, an acknowledgement message responsive to receipt of a status message. The acknowledgment message may include a header identifying the sender of the acknowledgement message. The fuel car may then use receipt of an acknowledgement (e.g., within a predetermined time interval of transmission of a status message) to identify the recipient (or recipients) of the status message. Because the status message was transmitted along a channel dedicated to a particular fuel distribution path, the fuel car may identify or associate the sender of the acknowledgement as the recipient of the status message and as a vehicle supplied by the fuel car along the particular fuel distribution path. Thus, by using identifying information in the announcement and acknowledgement messages, the sender and recipient of an associated status message may mutually identify each other, such that the powered rail vehicle identifies a source of fuel supplying the powered rail vehicle, and the fuel car identifies a powered rail vehicle receiving fuel from the fuel car along a particular fuel distribution path. The process may be repeated for each fuel distribution path of a given fuel car and/or for each fuel car of a vehicle system. In various embodiments, fuel cars may be configured to avoid sending an announcement message and/or status message within a predetermined amount of time of transmission of an announcement message from a different fuel car.

Once the various announcement, status, and acknowledgement messages have been transmitted for each fuel car of a vehicle system, each powered rail vehicle may know which fuel car supplies that particular powered vehicle, and each fuel car may know which powered rail vehicles it supplies (and via which fuel distribution path it supplies each particular powered rail vehicle). Thus, in the illustrated embodiment, after the identification procedure is successfully completed, each powered rail vehicle, 130, 140 identifies the fuel car as a source of fuel. Further, the fuel car identifies the powered rail vehicle as being supplied by the fuel car via the fuel distribution path, the powered rail vehicle as being supplied by the fuel car via the fuel distribution path, and the powered rail vehicle as being supplied by the fuel car via the fuel distribution path. Additionally, as part of an acknowledgement message or subsequent message, the first powered rail vehicle may identify itself as the lead vehicle to the fuel car. In various embodiments, the lead vehicle may have additional authority to provide certain commands or control to the fuel car. For example, the lead vehicle may be authorized to overrule a fuel request by a different vehicle, and/or to arbitrate or decide between competing requests for fuel.

Thus, a given powered vehicle may transmit a request for fuel over the first channel, and the fuel car may determine the request is from a vehicle supplied by the fuel car, for example using identifying information in the header of the fuel request message. For example, the first powered rail vehicle may send a fuel request message including a header identifying the sender as "Vehicle A." Based on an acknowledgement message sent responsive to a status signal along the first status channel, the fuel car may recognize "Vehicle A" as being supplied by the fuel car via the fuel distribution path, and send fuel to the powered rail vehicle via the fuel distribution path. Similarly, any fuel request messages identifying a vehicle that has not acknowledged receipt of a status message from the fuel car may be ignored by the fuel car. Additional messages or information such as emergency messages or safety messages, among others, may be communicated between powered rail vehicles and fuel cars. For example, the fuel car may determine that the fuel car is low on fuel. The fuel car may then transmit a low fuel message over the first channel identifying "Vehicle Z" in a header. Then, each powered rail vehicle that is supplied by the fuel car may determine that its supply source is low on fuel, and make any necessary adjustments or perform any necessary actions. Other vehicles not associated with the fuel car may ignore the low fuel message.

In one example scenario, the fuel car may be positioned in the vehicle system and connected (e.g., fuel distribution hoses attached, MU cable attached, or the like) to the powered rail vehicles but not have on-board knowledge or information at an initial or start time of which particular powered rail vehicle is joined via which particular fuel distribution path and/or where particular powered rail vehicles are positioned relative to the fuel car.

To determine which vehicle is supplied by a given fuel distribution path, in the example scenario, the fuel car sends an announcement message received by all of the powered rail vehicles via the first communication channel announcing that the fuel car will send a status signal via a status channel. In some embodiments, the announcement message may be sent responsive to a request from one or more of the powered rail vehicles. In various embodiments, each vehicle that receives the announcement may send a message confirming receipt of the announcement. The announcement message may include a header providing an identification of the fuel car (e.g., a unique name, number, or other alphanumeric code assigned to the fuel car). In the illustrated embodiment, the fuel car is identified as "Vehicle Z." After sending the announcement message (e.g., within a predetermined time after sending the announcement message), the fuel car sends a status signal along a particular status channel. (In alternate embodiments, the announcement message may be sent after the status signal). The status signal may be a toggled electrical signal sent via a wire or cable, a message (e.g., an encoded message) sent via a wire or cable, or a pressure pulse (either positive or negative) sent via a fuel distribution path, among others. Because the status signal is sent only via a particular status channel, and because each status channel in the illustrated embodiment only couples the fuel car with a single powered rail vehicle, the status signal will only reach one powered rail vehicle. For example, in the example scenario, after transmitting an announcement signal over the first channel, the fuel car transmits a status signal over the first status channel, which will then be received only by the first powered vehicle.

Continuing the example scenario, once the given powered rail vehicle receives the status message, the powered rail vehicle sends an acknowledgment message via the first communication channel. Thus, in the example scenario, the powered rail vehicle transmits an acknowledgment message over the first channel including a header identifying the powered rail vehicle (e.g., a header including identification information corresponding to "Vehicle A"). Because the acknowledgement message is transmitted over the first channel, all of the vehicles receive the acknowledgement message. Thus, the fuel car may identify "Vehicle A" (the powered rail vehicle) as having received the status message sent along the first status channel, and therefore determine that "Vehicle A) is supplied via the first fuel distribution channel. Further, the second powered rail vehicle and the third powered rail vehicle may also be aware that "Vehicle A" (the first powered rail vehicle) has received and acknowledged a status message from "Vehicle Z."

Additional requests, announcements, and/or status messages or signals may be transmitted until all pertinent vehicles are accounted for. For example, a given fuel car may perform status checks until all status channels of the fuel car are accounted for. If an acknowledgement is received corresponding to status channel associated with a given fuel distribution path, then the fuel car may associate the responding powered rail vehicle with the given fuel distribution path. If no acknowledgment is received, the fuel car may determine that the given fuel distribution path is not connected to any vehicle, and may prevent distribution of fuel through the given fuel distribution path. In the example scenario, a subsequent status message transmitted from the fuel car along the second status channel 164 may be acknowledged by the second fuel car 130 or "Vehicle B," and the fuel car may determine that the fuel car supplies "Vehicle B" along the second fuel distribution path. Thus, responsive to future requests for fuel from "Vehicle B," the fuel car may distribute fuel via the second fuel distribution path. An additional subsequent status message transmitted from the fuel car along the third status channel 166 may be acknowledged by the third fuel car 140 or "Vehicle C," and the fuel car may determine that the fuel car supplies "Vehicle C" along the third fuel distribution path. Thus, responsive to future requests for fuel from "Vehicle C" (e.g., as identified by a header of the request), the fuel car may distribute fuel via the third fuel distribution path. Thus, the fuel car and one or more powered vehicles associate with each other and may communicate requests for fuel or other communications. For example, the fuel car, by virtue of its previously associating "Vehicle A," "Vehicle B," and "Vehicle C" with itself, may appropriately respond to messages identifying any of those vehicles as senders, while appropriately ignoring messages such as fuel requests from vehicles that the fuel car is not associated with.

Alternatively or additionally, a status message (or messages) may be sent from a powered rail vehicle (or vehicles) to identify a fuel car (or cars) with which the powered rail vehicle is coupled, and to identify an appropriate fuel distribution path to supply the powered rail vehicle. In some embodiments, the process of sending the various messages may be analogous to the above discussed examples regarding status messages from a fuel car, with the senders and recipients of certain messages reversed.

For example, in one example scenario, the first and second powered vehicles and the fuel car may be coupled and have associated themselves with each other. Subsequently, the third powered vehicle may be coupled to the vehicle system, for example via hosing or piping for fuel distribution, via a coupling mechanism to physically couple the third powered vehicle to the second powered rail vehicle, via connection of a MU line, or the like. The third powered vehicle may then send an announcement message over the first channel indicating that "Vehicle C" is going to send a status message, and the third powered rail vehicle may then send a status message via the third status channel. Upon receipt of the announcement message and associated status message, the fuel car may determine that "Vehicle C" has sent the status message along the third status channel, and, based on the announcement and associated status message, determine that "Vehicle C" is coupled to the fuel car via the third fuel distribution path. Further, the fuel car may send an acknowledgment message indicating that "Vehicle Z" received the status message, and the third powered rail vehicle may then determine that "Vehicle Z" supplies the third powered rail vehicle with fuel. Accordingly, the fuel car may respond appropriately to messages from or pertaining to the third powered rail vehicle, and the third powered rail vehicle may respond appropriately to messages from or pertaining to the fuel car.

Figure 2:
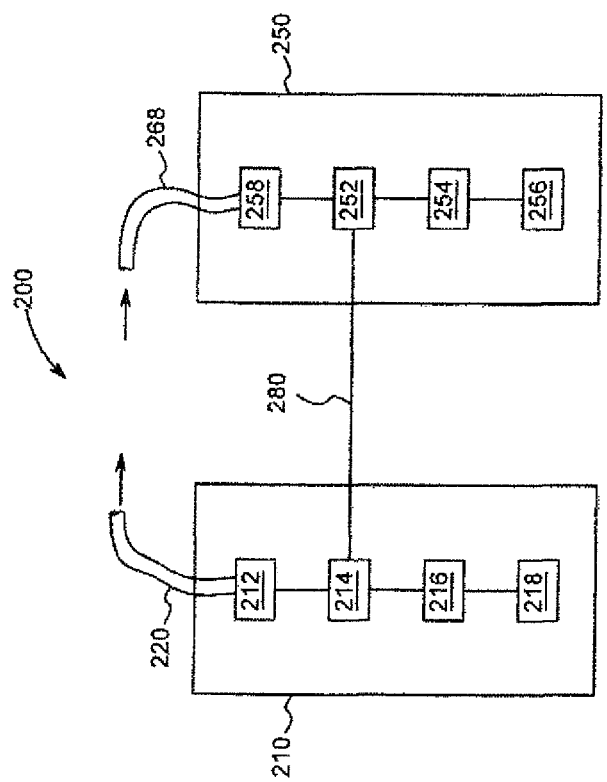
FIG. 2 is a schematic diagram of a vehicle system, according to an embodiment.
Figure 3:
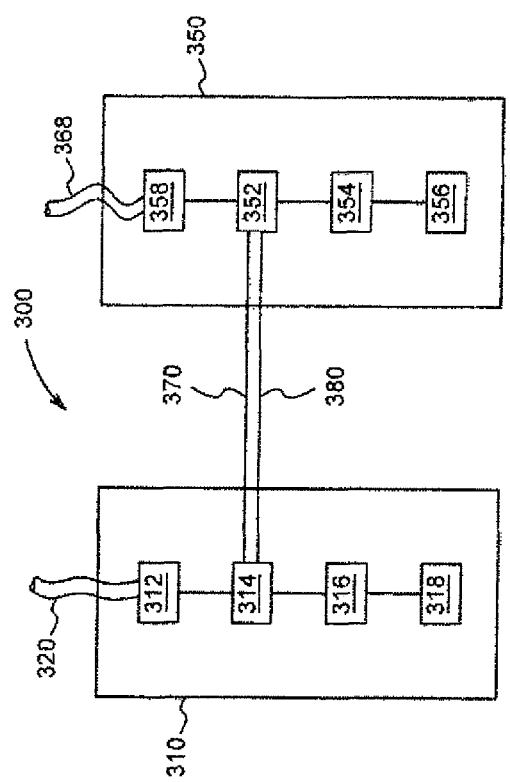
FIG. 3 is a schematic diagram of a vehicle system, according to an embodiment.

In the illustrated embodiment, the fuel car includes a system having a communication module 112 and a determination module 114. In various embodiments, the communication module 112 may be configured to control communications between the fuel car and other vehicles via the first channel as well as the various status channels, and the determination module 114 may be configured to determine which particular powered vehicle or vehicles is supplied by which particular fuel distribution path, and/or to determine a relative position of the various powered rail vehicles supplied by the fuel car with respect to the fuel car. FIGS. 2 and 3 provide additional discussion regarding various modules in example embodiments. It should be noted that one or more communication modules and/or determination modules may be disposed additionally or alternatively on one or more powered vehicles.

Returning to FIG. 1, the communication module in the illustrated embodiment may be disposed on-board the fuel car or on the powered vehicle. The communication module may communicate via the first channel and via the status channels 162, 164, 166. As indicated above, the first channel may be configured for transmission of announcement and/or acknowledgement messages corresponding to or associated with a status message. Thus, the communication module may send or receive one or more of announcement, acknowledgement, or status messages as discussed herein. The communication module may send or receive additional messages, for example, safety messages regarding a safety status or condition of fuel storage or fuel delivery, control or command messages regarding the delivery of fuel, or the like.

In the illustrated embodiment, the determination module may be disposed on-board the fuel car or on the powered vehicle. The determination module may associate at least one vehicle (e.g., a powered rail vehicle that receives fuel from the fuel car) with a fuel distribution path. The determination module may determine the association based on at least one of a source or recipient of a status signal or acknowledgment signal. For example, in some embodiments, the fuel car may transmit a status signal over a status channel, and a powered rail vehicle may acknowledge receipt of the status signal. The determination module may then associate the powered rail vehicle that sent the acknowledgement message with a fuel distribution path associated with the status channel over which the status signal was sent. As another example, in some embodiments, the fuel car may receive a status signal over a status channel from a powered vehicle that also transmits an associated announcement message identifying the powered vehicle. The determination module may associate the powered vehicle identified in the announcement message with a fuel distribution path associated with the status channel over which the corresponding status signal was received by the communication module. In various embodiments, the determination module may identify a particular powered vehicle for each fuel distribution path. In other embodiments, the determination module may identify more than one vehicle with a particular fuel path, for example by determining a position or orientation of the powered vehicles with respect to the fuel car.

FIG. 2 is a schematic view of a vehicle system 200 formed in accordance with various embodiments. The vehicle system may send status signals as a light signal via fiber optics, as a pressure pulse or as a variation in pressure in a pressurized line. In the embodiment depicted in FIG. 2, the fuel distribution path is configured as a status channel, as the pulse or variation in pressure is transmitted along the fuel distribution path. The arrangement depicted in FIG. 2 is intended by way of example for illustrative purposes, and that other arrangements (e.g., additional or different modules) may be employed in various embodiments.

The vehicle system shown in FIG. 2 includes a fuel car processing module 210 and a powered rail vehicle processing module 250. In various embodiments, the vehicle system may include plural powered rail vehicle processing modules associated with the fuel car processing module. Also, one or more aspects of the fuel car processing module may be located other than on the fuel car.

The fuel car processing module may be disposed on-board at least one of the powered vehicles, the un-powered vehicles, or even on the fuel car. The fuel car may provide fuel to one or more powered rail vehicles during a trip or mission performed by the vehicle system. In the illustrated embodiment, the fuel car processing module 210 includes a fueling module 212, a communication module 214, a determination module 216, and a memory 218. The fueling module may control the distribution of fuel from the fuel car via a fuel distribution path, and this distribution may be in response to the fueling demands (or expected demands) of the engine on the powered vehicle. The fuel distribution path operably connects the fuel car in fluid communication with one or more powered rail vehicles for which the fuel car supplies fuel. Also, in various embodiments, the communication module may control communications with one or more powered rail vehicles via a first channel 280 as well as the fuel distribution path. For example, announcement messages, acknowledgment messages, control or command messages, status messages, or the like may be transmitted via the first channel. In various embodiments, the first channel may be an MU line configured for Ethernet over MU communications. The determination module may determine associations between one or more fuel distribution paths and one or more powered rail vehicles of a consist including the fuel car. For example, the determination module may identify, for each fuel distribution path, a corresponding powered rail vehicle supplied via that particular fuel distribution path. The determination module may determine if any fuel distribution paths are idle, or not connected to any powered rail vehicle. Further, the determination module may identify powered rail vehicles of the consist that are not supplied by the fuel car.

In the illustrated embodiment, the fueling module may control the distribution of fuel from the fuel car via the fuel distribution path. The fueling module may include one or more pumps, sensors (e.g., pressure and/or flow sensors), valves, or the like. Only one fuel distribution path is shown for clarity and ease of illustration in FIG. 2; however, in various embodiments, plural fuel distribution paths may be employed, for example, with each fuel distribution path leading from a fuel car to a particular vehicle, or to a group of vehicles (e.g., vehicles disposed on a given side of a fuel car). The communication module 214 may provide an instruction to the fueling module 212 to provide a pulse (for use as a status signal) along a specified fuel distribution path at a specified time or within a specified time range, and the fueling module may control the specified fuel distribution path to provide the specified pulse. As another example, the determination module (or other aspect of the fuel car processing module) may provide an instruction to distribute fuel along one or more paths, and the fueling module may control the distribution of the fuel responsive to the instruction.

As indicated herein, in the embodiment depicted in FIG. 2, the communication module may control communications with one or more powered rail vehicles via a first channel 280 as well as the fuel distribution path 220. The first channel 280, for example, may include an MU line configured for Ethernet over MU communications. The communication module 214, for example, may transmit an announcement message over the first channel indicating that a status signal will be transmitted via a fuel distribution path. The communication module 214 may then provide an instruction to the fueling module to provide the announced status signal. After the status signal is sent, a powered vehicle that senses the status signal may acknowledge that the message is received, analyzed, and/or processed by the communication module.

The determination module may determine associations between one or more fuel distribution paths and one or more powered rail vehicles of a consist including the fuel car. For example, the determination module may receive information from the communication module indicating the sender of an acknowledgment message as well as the particular fuel distribution path along which the status pulse was transmitted. Based on the identity of the recipient (e.g., the sender of the acknowledgement message as determined, for example, from information in a header of the acknowledgement message) and the particular fuel distribution path utilized to send the status signal or pulse, the determination module may determine that the fuel distribution path associated with the status pulse supplies with fuel the vehicle that initiated acknowledgement message. Further, in various embodiments, the transmission of pressure pulses may be utilized as a safety check or confirmation of proper connection of one or more fuel distribution paths.

In some embodiments, if no acknowledgment or other message is transmitted which may be used to associate a fuel distribution path with at least one vehicle, the determination module may determine that the particular fuel distribution path is not connected or is not properly connected to a recipient vehicle, and the fueling module may be instructed to prevent distribution of fuel via the particular fuel distribution path. In various alternate embodiments, even if a differently configured status channel and/or different communication or identification schemes are employed (e.g., use of an electrical status signal or message transmitted via a status channel configured as a discrete wire or cable), status pulses transmitted via the fuel distribution path may be employed to confirm proper coupling or connection between a fuel car and a powered vehicle for fuel distribution.

The determination module may determine, responsive to a fuel request message, which vehicle or vehicles are to be supplied with fuel, which fuel cars may be available to supply the fuel, and which fuel distribution path or paths are to be employed to supply the fuel from the fuel car. For example, a request for fuel may be transmitted by a powered rail vehicle over the first channel by the communication module. Using information from the header of the request, the communication module and/or the determination module may determine the identity or position of the requesting vehicle relative to a fuel car. Based on the identity or position of the requesting vehicle, the determination module may determine the appropriate fuel distribution path to supply the requesting vehicle, and instruct the fueling module to request fuel to be provided via the determined fuel distribution path. For example, after the determination module has associated one or more fuel distribution paths with one or more vehicles, the results may be tabulated and stored in a database (e.g., in a database within the determination module or accessible by the determination module, for example in a database stored in the memory), with the determination module utilizing the database to identify the appropriate fuel distribution path(s).

In the illustrated embodiment, the powered vehicle processing module 250 is disposed on-board a powered rail vehicle (not shown in FIG. 2). The powered rail vehicle is communicably coupled to the fuel car and is configured to receive fuel supplied by the fuel car (e.g., by one or more of hoses, pipes, or other conduit). The depicted powered vehicle processing module includes a communication module 252, a determination module 254, a memory 256, and a fueling module 258, which is configured to control the supply and/or receipt of fuel via a fuel conduit 268. The fuel conduit may form a portion of the fuel distribution path. The communication module may control communications with a fuel car and, optionally, one or more other powered rail vehicles via a first channel 280 as well as the fuel conduit. For example, announcement messages as discussed herein, acknowledgment messages as discussed herein, control or command messages, status messages, or the like may be transmitted via the first channel. The determination module may determine the identity of a fuel car that supplies the vehicle with fuel.

In the illustrated embodiment, the communication module 252 is configured to control communications via the first channel 280 as well as to receive and/or process information from the fueling module 258, for example an indication or information from the fueling module 258 that a pressure pulse has been received or detected by the fueling module 258. The communication module 252 may be configured to provide an acknowledgement message via the first channel 280 if a status pulse is received. In various embodiments, the communication module 252 may also be configured to prepare and/or transmit messages requesting a status signal, messages indicated that a status signal was not received, emergency or status messages corresponding to a state of the powered vehicle on which the powered vehicle processing module 250 is disposed, fuel request messages indicating that the powered vehicle requires fuel or is below a predetermined threshold level of fuel, or the like.

The depicted determination module 254 is configured to determine the identity of a fuel car that supplies the powered vehicle with fuel. For example, using a name or other identifier from a header of an announcement message associated with (e.g., transmitted within a predetermined time range) a status signal received by the fueling module and identified by the communication module, the determination module may determine that the fuel car identified in the announcement message supplies the powered vehicle. The determination or identification may be utilized by the powered vehicle processing module during operation of the powered vehicle. For example, the powered vehicle processing module may respond to the receipt of status messages identifying a supplying fuel car, while ignoring status message of other, non-identified or non-associated fuel cars. In some embodiments, responsive to receipt of an announcement message indicating an upcoming status, the determination module may perform a safety check, equipment health diagnostic, or other test status to determine whether the powered vehicle may send or receive such a pulse, and instruct the communication module to inform the fuel car accordingly.

In the illustrated embodiment, the fueling module may measure, detect, and/or control the flow of fuel through the fuel conduit. For example, the fueling module may detect a status pulse transmitted via the fuel conduit, and inform the communication module of the receipt of the status pulse. Further, in various embodiments, the fueling module may control a valve or governor to permit fuel flow into the powered vehicle, or to prevent fuel flow into the powered vehicle (for example, if a tank of the powered vehicle is full). For instance, in embodiments in which a given fuel distribution path supplies more than one powered vehicle (e.g., the fuel distribution path may include separate branches dedicated to specific vehicles), the fueling modules of the respective vehicles may be used to control the supply of fuel. As one example, a fuel distribution path may have first and second branches supplying first and second vehicles. If the first vehicle requires fuel but the second vehicle does not, the first vehicle may operate a governor to allow fuel sent via the fuel distribution path to enter the tank of the first vehicle while the second vehicle may operate a governor to prevent fuel entry into a tank of the second vehicle, and avoiding an undesired diversion of fuel away from the first vehicle.

In other embodiments, a discrete wire or cable may be utilized for a status channel. FIG. 3 is a schematic view of a vehicle system 300 formed in accordance with various embodiments. Various aspects of the vehicle system may be similar to embodiments discussed herein such as the vehicle system of FIG. 2; however, the instant vehicle system may have status signals sent as an electrical signals over discrete (e.g., separately configured and/or separately controlled from a main communication channel) wires or cables. It should be noted that the arrangement depicted in FIG. 3 is intended by way of example for illustrative purposes, and that other arrangements (e.g., additional or different modules) may be employed in various embodiments.

The vehicle system shown in FIG. 3 includes a fuel car processing module 310 and a powered rail vehicle processing module 350. In various embodiments, the vehicle system may include plural powered rail vehicle processing modules associated with the fuel car processing module.

One or more aspects of the fuel car processing module 310 may be disposed on-board a powered vehicle coupled to a fuel car. The fuel car may provide fuel to one or more powered rail vehicles during a trip or mission performed by the vehicle system. In the illustrated embodiment, the fuel car processing module includes a fueling module 312, a communication module 314, a determination module 316, and a memory 318. Generally, in various embodiments, the fueling module may control the distribution of fuel from the fuel car via a fuel distribution path 320. The fuel distribution path operably connects the fuel car in fluid communication with one or more powered rail vehicles for which the fuel car supplies fuel. In various embodiments, the fuel distribution path may include plural branches each dedicated to supplying a given vehicle. For example, a first fuel distribution path may be configured to provide fuel to all vehicles positioned on a first side of the fuel car, and a second fuel distribution path may be configured to provide fuel to all vehicles positioned on a second side of the fuel car.

The communication module may control communications with one or more powered rail vehicles via a status channel 370 and a first channel 380. For example, announcement messages, acknowledgment messages, control or command messages, status messages, or the like may be transmitted via the first channel. In various embodiments, the first channel 380 may be an MU line configured for Ethernet over MU communications. Status signals or messages may be transmitted via the status channel. Only one status channel is shown in the illustrated embodiment for clarity and ease of illustration, however, additional status channels may be employed in various embodiments. Each status channel may be associated with a particular fuel distribution path, and may include a wire or cable communicatively coupling the fuel car processing module with each vehicle supplied via the particular fuel distribution path. In some embodiments, the status channel may be configured as a wire of a MU cable (distinct from any wire or wires utilized for Ethernet over MU communications) forming the main communication channel, with the status channel wire electrically separated at the fuel car. The determination module may determine associations between one or more fuel distribution paths and one or more powered rail vehicles of a consist including the fuel car. The determination module may determine if any fuel distribution paths are idle, or not connected to any powered rail vehicle. Further, the determination module may be configured to identify powered rail vehicles of the consist that are not supplied by the fuel car.

In the illustrated embodiment, the fueling module may control the distribution of fuel from the fuel car via the fuel distribution path. The fueling module may include one or more pumps, sensors (e.g., pressure and/or flow sensors), valves, or the like. Only one fuel distribution path is shown for clarity and ease of illustration in FIG. 2; however, in various embodiments, plural fuel distribution paths may be employed, for example, with each fuel distribution path leading to a particular vehicle in some embodiments, or to a group of vehicles (e.g., vehicles disposed on a given side of the fuel car). In various embodiments, the determination module (or other aspect of the fuel car processing module) may provide an instruction to the fueling module to distribute fuel along one or more paths, and the fueling module may control the distribution of the fuel responsive to the instruction.

The determination module 316 may determine associations between one or more fuel distribution paths and one or more powered rail vehicles of a consist including the fuel car on which the fuel car processing module 310 is disposed. For example, in some embodiments, the determination module 316 may receive information from the communication module 314 indicating the sender of an acknowledgment message as well as the particular status channel along which the status signal was transmitted. Based on the identity of the recipient and the particular fuel distribution path associated with the status channel utilized to send the status signal, the determination module may determine which fuel distribution path supplies the vehicle. In some embodiments, plural vehicles may be associated with a given fuel distribution path. For example, all vehicles supplied by the fuel car disposed on a particular side of the fuel car may be supplied by branches of a shared fuel distribution path. A status channel may communicatively couple the fuel car processing module with each of the vehicles sharing the fuel distribution path, with each of the vehicles sending an acknowledgement to a status signal transmitted along the status channel. The determination module may determine that the responding vehicles are disposed on the particular side of the fuel car and/or associate the responding vehicles with the fuel distribution path.

In the illustrated embodiment, the powered vehicle processing module 350 may be disposed on-board a powered rail vehicle (not shown in FIG. 3). The powered rail vehicle is communicably coupled to the fuel car and is configured to receive fuel supplied by the fuel car (e.g., by one or more of hoses, pipes, or other conduit). The depicted powered vehicle processing module includes a communication module 352, a determination module 354, a memory 356, and a fueling module 358, which may control the receipt of fuel via a fuel conduit 368. The fuel conduit may be operably connected to and/or from a portion of the fuel distribution path in various embodiments. The communication module 352 is configured to control communications with a fuel car and, optionally, one or more powered rail vehicles via a first channel 380, as well as to communicate with the fuel car via the status channel. For example, announcement messages, acknowledgment messages, control or command messages, status messages, or the like may be transmitted via the first channel. The determination module may determine the identity of a fuel car that supplies the vehicle with fuel.

In the illustrated embodiment, the communication module may control communications via the first channel as well as to receive status signals via the status channel. The communication module may provide an acknowledgement message via the first channel if a status signal is received. In various embodiments, the communication module may prepare and/or transmit messages requesting a status signal, messages indicated that a status signal was not received, emergency or status messages corresponding to a state of the powered vehicle on which the powered vehicle processing module is disposed, fuel request messages indicating that the powered vehicle requires fuel or is below a predetermined threshold level of fuel, or the like.

The depicted determination module may determine the identity of a fuel car that supplies the powered vehicle with fuel. For example, using a name or other identifier from a header of an announcement message associated with (e.g., transmitted within a predetermined time range) a status signal received by the communication module, the determination module may determine that the fuel car identified in the announcement message supplies the powered vehicle. The determination or identification may be used by the powered vehicle processing module during operation of the powered vehicle. For example, the powered vehicle processing module may act appropriately upon receipt of status messages regarding the identified supplying fuel car, while ignoring status message of other, non-identified or non-associated fuel cars.

In the illustrated embodiment, the fueling module may measure, detect, and/or control the flow of fuel through the fuel conduit. In various embodiments, the fueling module may control a valve or governor to permit fuel flow into the powered vehicle, or to prevent fuel flow into the powered vehicle (for example, if a tank of the powered vehicle is full). For instance, in embodiments in which a given fuel distribution path supplies more than one powered vehicle (e.g., the fuel distribution path may include separate branches dedicated to specific vehicles), the fueling modules of the respective vehicles may be used to control the supply of fuel. As one example, a fuel distribution path may have first and second branches supplying first and second vehicles. If the first vehicle requires fuel but the second vehicle does not, the first vehicle may operate a governor to allow fuel sent via the fuel distribution path to enter the tank of the first vehicle while the second vehicle may operate a governor to prevent fuel entry into a tank of the second vehicle, and avoiding an undesired diversion of fuel away from the first vehicle.

Figure 4:
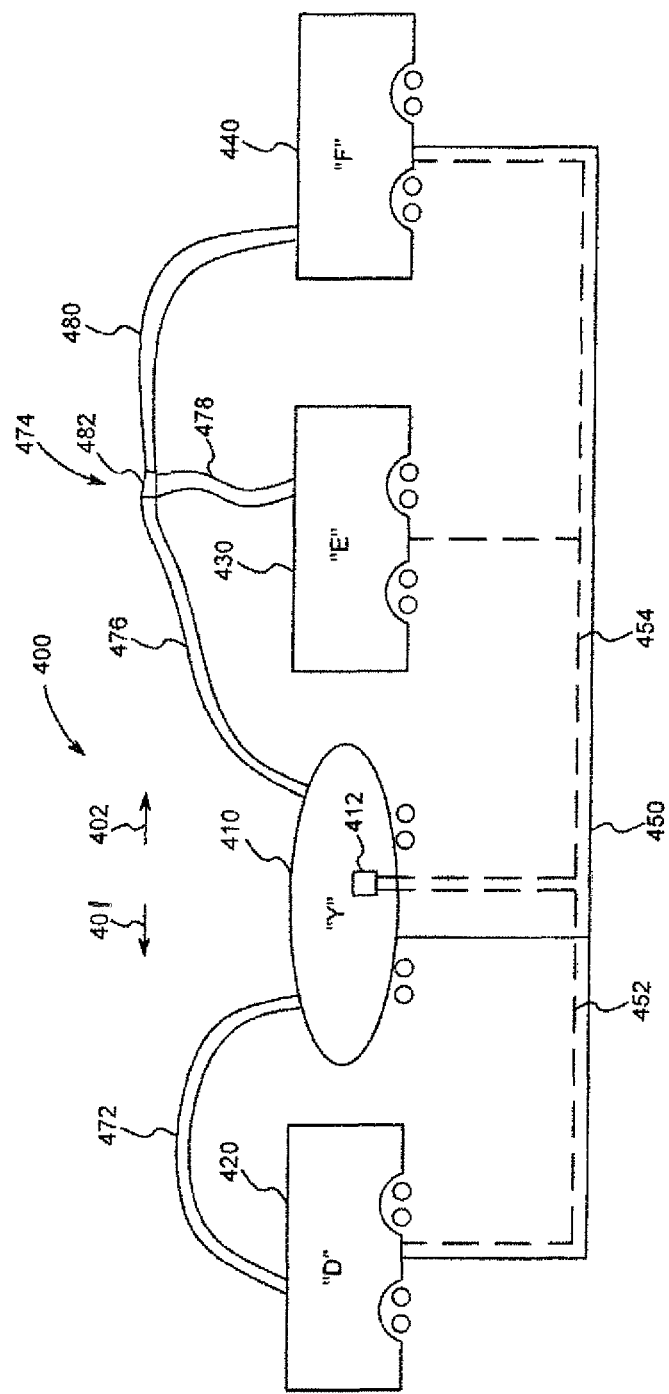
FIG. 4 is a schematic diagram of a vehicle system, according to an embodiment.

FIG. 4 illustrates a schematic view of a vehicle system 400 formed in accordance with various embodiments. The depicted vehicle system of FIG. 4 includes a fuel car 410, a first powered rail vehicle 420, a second powered rail vehicle 430, and a third powered rail vehicle 440. Additional and/or different types of vehicles or units may be employed in different embodiments. As one example, the vehicle system may include (or form a portion of) a larger consist including additional powered vehicles, fuel cars, and/or other non-powered vehicles.

The vehicle system may be similarly in certain respects to embodiments discussed herein, such as the vehicle system shown in FIG. 1. However, the vehicle system may associate powered vehicles to be supplied with fuel according to a direction or orientation of the powered vehicles relative to a fuel car. In the illustrated embodiment, a first fuel distribution path 472 supplies a first powered vehicle 420 (or "Vehicle D") disposed in a first direction 401 from a fuel car 410 (or "Vehicle Y"). Also, a second fuel distribution path 474 supplies a second powered vehicle 430 (or "Vehicle E") and a third powered vehicle 440 (or "Vehicle F") disposed in a second direction 402 from the fuel car 410.

The second fuel distribution path 474 in the illustrated embodiment includes a first branch 478 and a second branch 480 joined at a junction 482 to a conduit 476 leading to the fuel car. The first branch may supply the second powered vehicle with fuel, and the second branch may supply the third powered vehicle with fuel.

The vehicle system includes a first communication channel 450 that communicably couples the fuel car, the first powered vehicle, the second powered vehicle, and the third powered vehicle. The first channel may be similar in certain respects to the other primary channels discussed herein, and may be a main communication channel or an operations communication channel. The first channel may be in a star configuration or the like. Each node (e.g., each of the vehicles operably connected via the first channel) may access signals, messages, or other communications transmitted via the first communication channel. In various embodiments, the first channel may be Ethernet over MU communications.

In the embodiment depicted in FIG. 4, one or more lines of the MU cable forming the first channel may be used as the second or status channel. For example, one or more lines of a MU cable used for Ethernet over MU communications may be used as a main communication channel, and a line of the MU cable not used for Ethernet over MU communications may employed as one or more status channels. For example, a line of the MU cable may be electrically separated at a communication module 412 of the fuel car. The line may be a single line, for example, that is split into a first status channel 452 that extends in the first direction 401 and a second status channel 454 that extends in the second direction. Thus, the communication module (or other on-board processing unit or module of the fuel car) may determine that a signal transmitted via the first status channel was sent to or received by vehicles disposed in the first direction relative to the fuel car, and that a signal transmitted via the second status channel was sent to or received by vehicles disposed in the second direction relative to the fuel car. In various embodiments, it may be possible to determine which side of the fuel car a given powered vehicle is disposed, rather than a precise position of the powered vehicle. In various embodiments, one or more discrete lines (e.g., lines that are not a part of a MU line or cable) may be utilized as status channels.

In the illustrated embodiment, the first status channel may be associated with the first fuel distribution path 472, and the second status channel 454 is associated with the second fuel distribution path 474. There may be a transmission of an announcement message via the first channel announcing an upcoming status message, and then a transmission of a status message along the first status channel. The first powered vehicle may acknowledge the status message via an acknowledgement message transmitted over the first communication channel, including identifying information in a header of the status message. Thus, the powered vehicle ("Vehicle D") may identify itself as being disposed in the first direction relative to the fuel car, and determine that it ("Vehicle D") is supplied by the first fuel distribution path.

Similarly, there may be an announcement message via the first channel announcing a second status, and a transmission of a status signal along the second status channel. The second powered vehicle ("Vehicle E") and the third powered vehicle ("Vehicle F"), which may be both operably connected to the second status channel, may transmit acknowledgement messages, to determine that "Vehicle E" and "Vehicle F" are disposed to the second side of the fuel car and supplied by the second fuel distribution channel (which is associated with the second status channel).

Distribution of fuel to the second powered vehicle and the third powered vehicle may be controlled via one or more controllers associated with one or both of the second powered vehicle and the third powered vehicle. For example, in one example scenario, the fuel car may be identified through a request from "Vehicle E" transmitted along the first communication channel. It may have been previously determined that "Vehicle E" is supplied by the second fuel distribution path. However, there may be no information regarding which branch of the second fuel distribution path supplies the second powered vehicle. Thus, a controller associated with one or both of the second powered vehicle or the third powered vehicle may, using the fuel request identifying "Vehicle E" as the requesting vehicle, operate a valve associated with the junction to direct fuel along the first branch to the second powered vehicle. Alternatively or additionally, a governor associated with a branch supplying a vehicle not requesting or needing fuel (in the example scenario, the third powered vehicle or "Vehicle F") may operate to prevent a flow of fuel to itself. A governor or valve associated with the supply of fuel to the third powered vehicle via the second branch may operate to prevent the flow of fuel through the second branch, thereby directing fuel via the first branch to the second powered vehicle ("Vehicle E").

Figure 5:
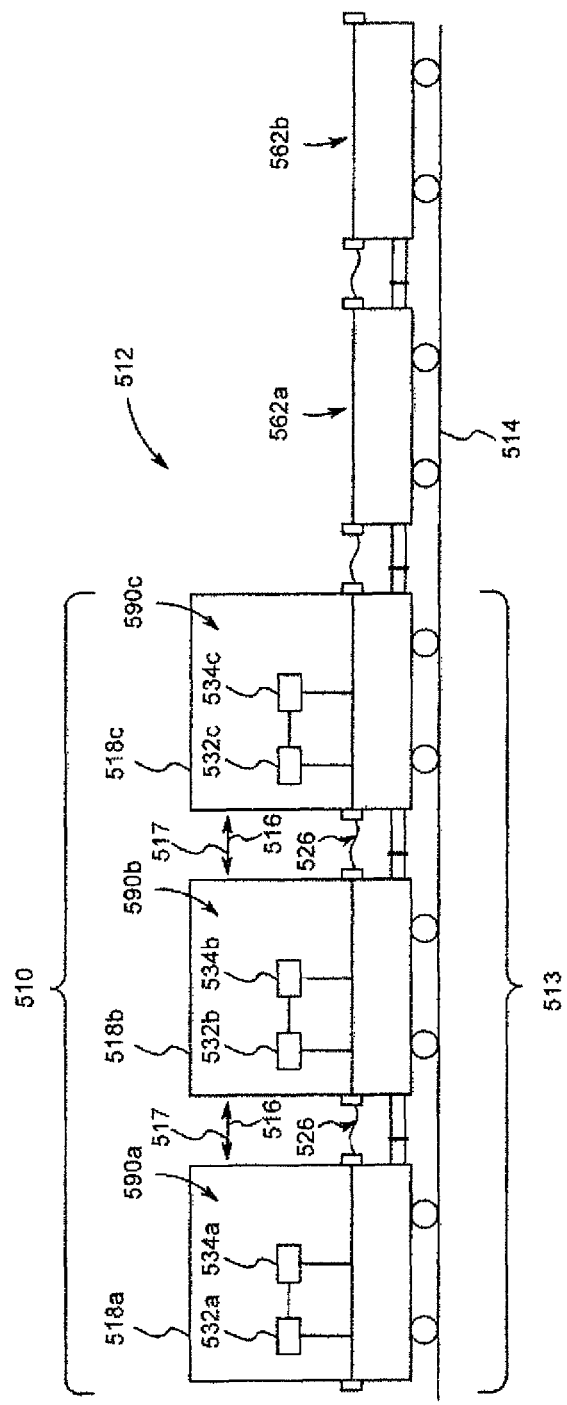
FIG. 5 illustrates a system network (or communication system) of a vehicle system formed in accordance with one embodiment.

Additional detail regarding Ethernet over MU communications will be discussed in connection with FIGS. 5-7. FIG. 5 illustrates a system network (or communication system) 510 of a vehicle system 512 formed in accordance with one embodiment. The vehicle system includes a plurality of vehicles (or units) 518a-518c and 562a, 562b that are mechanically coupled to one another to form a consist 513, and are configured to traverse a route 514. In some embodiments, the vehicles may be rail vehicles (e.g., locomotives, shunters, switchers) and the route may include railroad tracks. Different vehicles of a vehicle consist may coordinate operations (e.g., tractive and braking efforts) with other vehicles to move the vehicle consist and, consequently, the vehicle system. The vehicle system may include only a single vehicle consist or a plurality of vehicle consists. For such embodiments that include multiple vehicle consists, each vehicle consist may coordinate operations with other vehicle consists to move the vehicle system. For example, individual consists may communicate with each other (e.g., via a wireless communication system).

The data communicated between vehicles of the vehicle system may be network data. In some embodiments, "network data" includes data packets that are configured in a designated packet format. For example, data may be packaged into a data packet that includes a set of data bits that are arranged to form a control portion and a payload portion. The control portion of the data bits may correspond to addresses (e.g., source, destination), error detection codes (e.g., checksums), and sequencing information (e.g., timing information). The control portion may be found in packet headers and trailers of the corresponding data packet. The payload portion of the data bits may correspond to the information that was requested and/or is used by the vehicle system for a designated purpose, such as for making operational decisions and/or for controlling operations (e.g., tractive efforts, braking efforts, and the like) of the vehicle system. The payload portion may include operating data. Operating data may include different types of data from various components of a vehicle system that are used to control operation of the vehicle system. For example, the operating data may include information from sensors that indicates a performance level or state of a component of the vehicle system. For instance, fuel sensors may be configured to transmit signals that are indicative of a current fuel level or current fuel efficiency. In rail vehicle systems, sensors coupled to the engine or motors may transmit data that indicates a notch (or throttle) level of the rail vehicle system. Sensors may also be coupled to various elements of mechanical systems (e.g., motors, engines, braking systems) and transmit signals indicating when a corresponding element is properly operating or has failed. Operating data may also include information from data radios and global positioning system (GPS) units. GPS units may transmit information describing or indicating a position of the vehicle system. Data radios may transmit information regarding one or more different vehicles of the vehicle system.

With respect to the network data, the data packets may be packaged and communicated in accordance with a designated communications protocol. The designated communications protocol may include predetermined rules and formats for exchanging data packets between nodes or computing systems. Various communications protocols may be used for embodiments described herein including, but not limited to, an industry standard communications protocol, a proprietary communications protocol, and/or an open-source or publicly available communications protocol. In some embodiments, the data packets are packaged and communicated according to an Internet-layer type protocol for packet-switched internetworking. For example, the data packets may be packaged and communicated in accordance with Internet Protocol version 6 (IPv6) or in accordance with Internet Protocol version 4 (IPv4). Alternatively or additionally, the data packets may be packaged and/or communicated in accordance with another IP protocol version or another protocol. Network data may be generally configured for the Internet protocol suite, which may be referred to as TCP/IP due to the Internet protocol suite including the Transmission Control Protocol (TCP) and Internet Protocol (IP). Network data may also be configured according to the Session Initiated Protocol (SIP). Other communications protocols, however, exist and may be used by alternative embodiments. As described herein, certain portions of a system network may be configured for transmitting network data packets in a first packet format and other portions of the same system network may be configured for transmitting network data packets in a second packet format.

The data communicated between the vehicles may also be non-network data. Non-network data may be data that is not packaged or formatted according to the same communications protocol as the network data described herein. By way of example only, the non-network data may include legacy data that is communicated between vehicles using a protocol that is not an Internet-layer protocol. Although not packaged the same as network data, content of the non-network data may include information for operating or controlling the vehicle system (e.g., operating data as described above). The non-network data may also be transmitted over a different communication path than the network data (e.g., non-network data sent over a first path, and network data sent over a second path).

In the illustrated embodiment, the vehicle system may include a single vehicle consist that includes multiple vehicles or units. In other embodiments, however, the vehicle system may include a plurality of vehicle consists that are directly or indirectly linked to one another in the vehicle system. As shown in FIG. 5, the vehicle system includes a plurality of powered vehicles 518a-518c. As used herein, a "powered vehicle" is a vehicle that is capable of self-propulsion. The vehicle system may include non-powered vehicles (or units) 562a, 562b that do not provide propulsive efforts. In the illustrated embodiment, the non-powered vehicles are rail cars used for cargo and/or carrying passengers. One or more non-powered vehicles may be a fuel car (e.g., fuel car), and may receive and send communications over a MU line operably connected to the vehicles of the vehicle system. The non-powered vehicles may receive electric current to power one or more loads disposed on-board the non-powered vehicles.

In some embodiments, one vehicle may control operation of other vehicles and, as such, the one vehicle may be referred to as a lead vehicle while and the other vehicles may be referred to as remote vehicles or trail vehicles. In alternative embodiments, however, control of the different operations of the vehicle system may be distributed among a plurality of the vehicles. In the illustrated embodiment, each of the vehicles may be adjacent to and mechanically coupled with another vehicle in the vehicle system such that each and every vehicle is directly or indirectly connected to the other vehicles. In one or more embodiments, the non-powered vehicles may be positioned before, after, or between the powered vehicles.

The system network may include a plurality of sub-networks. For example, the system network may be a wide area network (WAN) and the sub-networks may be local area networks (LANs). In the illustrated embodiment, each of the vehicles includes a corresponding vehicle network 590a-590c, respectively. In some embodiments, the vehicle networks may constitute separate LANs that are part of a WAN (e.g., the system network). Although not shown, the vehicles may include a vehicle network in alternative embodiments.

In some embodiments, the system network corresponds to a single vehicle consist (e.g., the vehicle consist 513). The vehicle system may have a plurality of vehicle consists and, as such, the vehicle system may include a plurality of system networks. Accordingly, in some embodiments, a single vehicle system may include multiple WANs in which at least one of the WANs includes a plurality of vehicle networks (or LANs). In such embodiments, each of the vehicle consists may coordinate operations among the vehicles to move the vehicle system. The vehicle consists may also coordinate operations with one another to move the vehicle system.

Each of the vehicle networks may include a plurality of operational components 532a-c that are communicatively coupled to the corresponding vehicle network. Each of the operational components may have a network address (e.g., IP address) within the corresponding vehicle network. The network address may be a static or designated address that is established or assigned by an industry or proprietary standard or the address may be a dynamic address designated by the system network 510. Data may be transmitted between the different vehicles 518a-518c of the vehicle system 512 or, more specifically, between the different vehicle networks 590a-590c. Data may also be transferred between the depicted vehicle networks 590a-590c and a generally similar vehicle network of a fuel car. For example, data may be transmitted from the vehicle 518a to the vehicle 518b. In some embodiments, data transmitted within the vehicle networks 590a-590c (e.g., intra-network) is configured for one communications protocol, and data transmitted between the vehicle networks in the system network (e.g., inter-network) is configured for a different communications protocol. Further still, data transmitted between the vehicle networks may be transmitted along multiple paths using different techniques (e.g., data 516 sent using a standard MU format over a first path, and data 517 sent using an Ethernet over MU format over a second path).

As shown in FIG. 5, data 516, 517 may be transmitted over a communication channel or line, such as a multiple unit (MU) cable system 526. The MU cable system 526 may include an electrical bus that interconnects the lead powered vehicle 518a and the remote powered vehicles 518b, 518c in the vehicle system.

In some embodiments, a portion of the data may be transformed (e.g., modified, modulated, and/or converted) prior to transmission over the MU cable system. The transformed network data is indicated at reference number 517. For example, transformed network data may be data that is at least one of encapsulated or modulated. When data is encapsulated and/or modulated, the data may be changed from one form to a second, different form. Depending on the form, the data may be configured for transmission within a vehicle network or, separately, may be configured for transmission between vehicle networks. This transformed network data may be subsequently decapsulated (or translated) or demodulated such that the data is changed from the second form to the first form. In other embodiments, the data may be changed from the second form to a different, third form when the modified data is decapsulated or demodulated.

For various communication functions, the system network may include router transceiver units 534a, 534b, 534c that are disposed on-board the vehicles respectively, and are described in greater detail below. The router transceiver units may be communicatively coupled to operational components respectively, which are also disposed on-board the respective vehicles.

Figure 6:
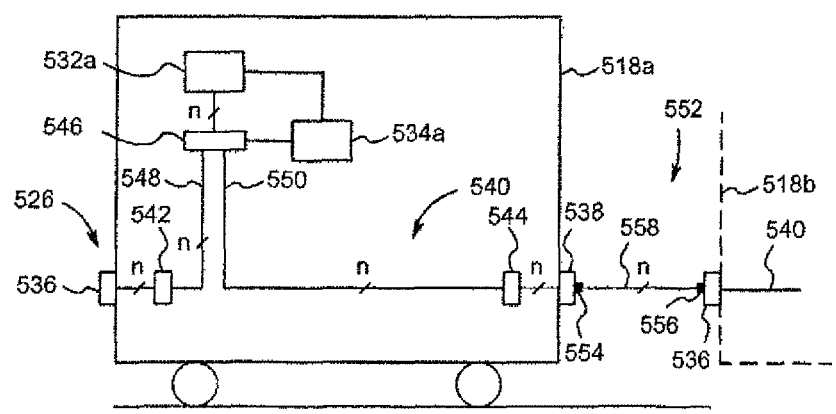
FIG. 6 is a schematic diagram of a multiple unit (MU) cable system in a vehicle, shown in the context of the system network of FIG. 5.

FIG. 6 shows aspects of the vehicle 518a and the MU cable system 526 in greater detail according to an embodiment. However, it should be noted that FIG. 3 illustrates one example of a powered vehicle and MU cable system and that other configurations may be possible. In some embodiments, the MU cable system may be an existing electrical bus interconnecting the vehicle 518a and the vehicles 518b, 518c in the vehicle consist (see FIG. 5). In the illustrated embodiment, for each of the vehicles 518a-518c, the MU cable system 526 comprises a first MU port 536, a second MU port 538, and an internal MU electrical system 540 that connects the first port and the second port to one or more operational components 532a of the vehicle 518a. In the example embodiment depicted in FIG. 3, the internal MU electrical system comprises a first terminal board 542 electrically connected to the first MU port, a second terminal board 544 electrically connected to the second MU port, a central terminal board 546, and first and second electrical conduit portions 548, 550 electrically connecting the central terminal board to the first terminal board 542 and the second terminal board 544, respectively. The one or more operational components 532a of the vehicle 518a may be electrically connected to the central terminal board and, thereby, to the MU cable system.

Figure 7:
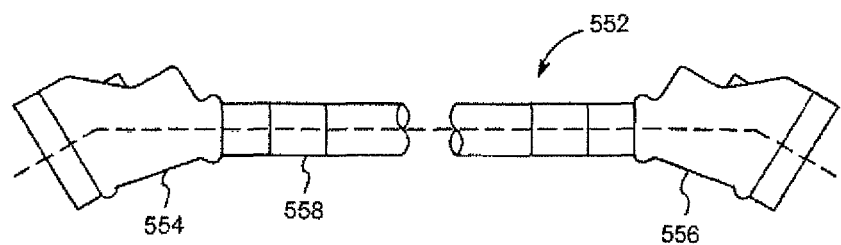
FIG. 7 is a schematic diagram of an MU cable jumper.

As shown in FIGS. 6 and 7, the MU cable system 526 further comprises an MU cable jumper 552. The jumper 552 comprises first and second plug ends 554, 556 and a flexible cable portion 558 electrically and mechanically connecting the plug ends together. The plug ends 554, 556 fit into the MU ports 536, 538. The MU cable jumper 552 may be electrically symmetrical, meaning either plug end can be attached to either port. The MU cable jumper 552 is used to electrically interconnect the internal MU electrical systems 540 of the adjacent vehicles 518a, 518b. As shown in FIG. 6, for each adjacent pair of vehicles 518a, 518b, one plug end 554 of an MU cable jumper 552 is attached to the second MU port 538 of the powered vehicle 518a, and the other plug end 556 of the MU cable jumper 552 is attached to the first MU port 536 of the powered vehicle 518b. The flexible cable portion 558 of the MU cable jumper extends between the two plug ends, providing a flexible electrical connection between the two vehicles 518a, 518b. In some embodiments, information is transmitted over the MU cable system according to a designated voltage carrier signal (e.g., a 74 volt on/off signal, wherein 0V represents a digital "0" value and +74 volts a digital "1" value, or an analog signal of 0V-74V, wherein the 0-74V voltage level may represent a specific level or percentage of functionality).

The cable portion (of the MU cable jumper) may include a plurality of discrete electrical wires, while the conduit portions 548, 550 each include one or more discrete electrical wires and/or non-wire electrical pathways, such as conductive structural components of the vehicle, pathways through or including electrical or operational components, circuit board traces, or the like. Although certain elements in FIG. 6 are shown as including "n" discrete electrical pathways, it should be appreciated that the number of discrete pathways in each element may be different, i.e., "n" may be the same or different for each element.

In some embodiments, the plug ends 554, 556 may include a plurality of electrical pins, each of which fits into a corresponding electrical socket in an MU port. The number of pins and sockets may depend on the number of discrete electrical wires or channels extant in the internal electrical system, MU cable jumper, etc. In one example, each plug end is a twenty seven-pin plug.

The central terminal board, the first terminal board 542, and the second terminal board 544 may each comprise an insulating base (attached to the vehicle) on which terminals for wires or cables have been mounted. This may provide flexibility in terms of connecting different operational components to the MU cable system.

Depending on the particular type and configuration of the vehicle, the electrical conduit portions 548, 550 and MU cable jumpers 552 may be configured in different manners, in terms of the number "n" ("n" is a real whole number equal to or greater than 1) and type of discrete electrical conduits. In one example, each conduit portion 548, 550 and the jumper cable portion 558 include a plurality of discrete electrical wires, such as 12-14 gauge copper wires. For example, the MU cable system may include 27 wires (and corresponding pins) configured corresponding to an MU configuration as listed in the following Table 1:

TABLE 1

MU configurations

| MU Pin Number | Function Name | Signal Originator |
| --- | --- | --- |
| 1 | Power Reduction (Analog) | Lead |
| 2 | Alarm Bell | Lead or Trail |
| 3 | "D" Governor Solenoid | Lead |
| 4 | Negative Voltage Common | N/A |
| 5 | Emergency Sand | Lead |
| 6 | Generator (Main Alternator) Field | Lead |
| 7 | "C" Governor Solenoid | Lead |
| 8 | Reverse | Lead |
| 9 | Forward | Lead |
| 10 | Wheel Slip Indicator | Lead or Trail |
| 11 | Spare | N/A |
| 12 | "B" Governor Solenoid | Lead |
| 13 | Control Circuits and Fuel Pump | Lead |
| 14 | Spare | N/A |
| 15 | "A" Governor Solenoid | Lead |
| 16 | Engine Run | Lead |
| 17 | Dynamic Brake Control | Lead |
| 18 | Spare | N/A |
| 19 | Spare | N/A |
| 20 | Dynamic Brake Warning | Lead or Trail |
| 21 | Dynamic Brake Interlock | Lead |
| 22 | Air Compressor Control | Lead |
| 23 | Manual Sand | Lead |
| 24 | Dynamic Brake Excitation (Analog) | Lead |
| 25 | Headlight | Lead |
| 26 | Ground Relay Reset | Lead |
| 27 | Spare | Lead |

It may be noted that, in various embodiments, a pin number identified as "spare" in the above table may be utilized in conjunction with a status channel. Additionally or alternatively, a pin number identified as "spare" in the above table may be utilized in conjunction with a channel for communicating fueling information. Further still, one or more pin numbers may be utilized for Ethernet over MU communications, including acknowledgement and/or announcement messages as described herein.

As used herein, the term "MU cable system" refers to the entire MU cable system or any portion(s) thereof, e.g., terminal boards, ports, cable jumper, conduit portions, and the like. As should be appreciated, when two vehicles are connected via an MU cable jumper 552, both the MU cable jumper and the internal MU electrical systems of the two vehicles together are part of the MU cable system. As subsequent vehicles are attached using additional MU cable jumpers, those cable jumpers and the internal MU electrical systems of the subsequent vehicles may become part of the MU cable system.

As should be appreciated, it may be the case that certain vehicles in a vehicle consist are equipped to de-modulate or de-capsulate (e.g., outfitted with a router transceiver unit) the data 517, and that other vehicles in the consist are not equipped as such. For example, there may be first and third equipped vehicles physically separated by a second vehicle that is not equipped to de-modulate the data, but is equipped to receive and utilize data 516 sent over a first communication path using standard MU techniques. In this case, the first and third vehicles are still able to communicate and exchange data via the second, or alternate, communication path even though there is a non-equipped vehicle between them. This may be possible due to the MU cable system extending through the non-equipped vehicles. In one case, for example, a vehicle consist comprises first, second, and third vehicles, with the second vehicle being disposed between the first and third vehicles. A first router transceiver unit is positioned in the first vehicle, and a third router transceiver unit is positioned in the third vehicle. The second vehicle, however, does not have a router transceiver unit or other functionality for transmitting and/or receiving the data over the MU cable system. Nevertheless, the data is transmitted between the first and third vehicles through the second vehicle, with the network data passing through a portion of the MU cable system in the second vehicle but not being de-modulated, de-encapsulated, or otherwise analyzed by the second vehicle.

Returning to FIG. 5, the system network may include the router transceiver units 534a, 534b, 534c of the respective vehicles 518a, 518b, 518c. The router transceiver units may be each communicatively coupled to the MU cable system. The router transceiver units may transmit and/or receive data (e.g., data in a standard MU format or other non-network data) as well as other data (e.g., data transmitted via a modulated signal over one or more wires or channels of a MU cable, such as via Ethernet over MU, or other network data) over the MU cable system. The router/transceiver units may be incorporated into, for example, a communication module. In some embodiments, the router transceiver units may change the data into a different form so that the data may be used by other operational components. For example, the router transceiver units may decapsulate or demodulate the data after the data is received.

Figure 8:
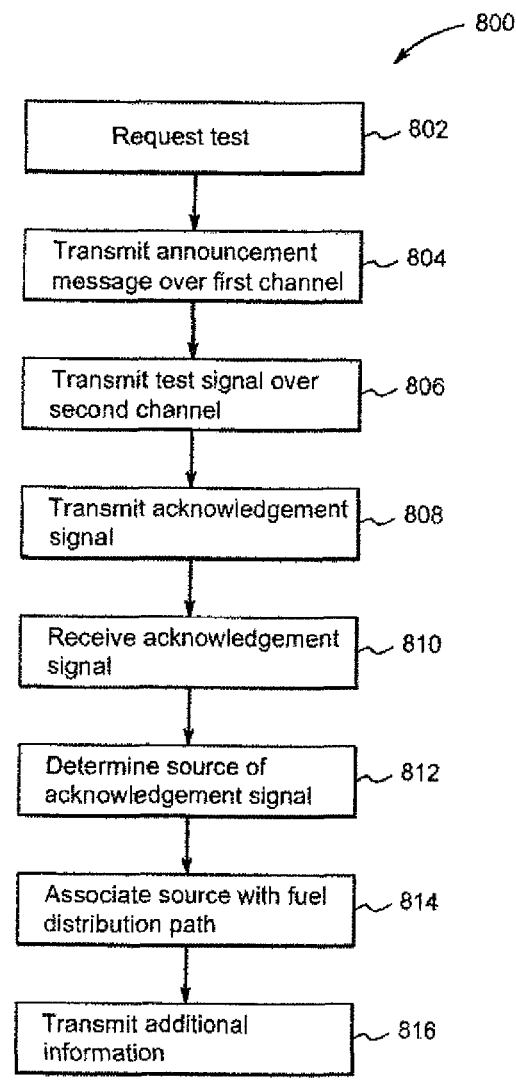
FIG. 8 illustrates a flowchart of a method for associating a fuel car with one or more powered vehicles of a vehicle system in accordance with one embodiment.

FIG. 8 illustrates a flowchart of a method 800 for associating powered vehicles with a fuel vehicle supplying the powered vehicles in accordance with one embodiment. The method may be performed, for example, using certain components, equipment, structures, or other aspects of embodiments discussed above. In certain embodiments, certain steps may be added or omitted, certain steps may be performed simultaneously or concurrently with other steps, certain steps may be performed in different order, and certain steps may be performed more than once, for example, in an iterative fashion. In various embodiments, portions, aspects, and/or variations of the method may be able to be used as one or more algorithms to direct hardware to perform operations described herein.

At step 802, a request for a status signal may be transmitted. For example, the request may be transmitted from a powered vehicle, in order for the powered vehicle and a fuel car supplying the powered vehicle to associate themselves with each other, and/or to identify a fuel distribution channel or supply line supplying the powered vehicle. The request may be transmitted over a first channel (e.g., an Ethernet over MU channel) accessible by some or all vehicles in a consist, including the fuel car and other powered vehicles supplied by the fuel car. In some embodiments, a fuel car may be configured to perform a status or transmit status signal without receiving a request for a status signal. For example, a fuel car may perform a status when one or more of the fuel car has an un-associated or un-identified fuel distribution path, when a mission begins, when a mission is stopped, when one or more vehicles are added to or removed from a consist, or at predetermined time intervals.

At step 804, an announcement message may be transmitted. In various embodiments, the fuel car transmits an announcement message over the first channel (e.g., an Ethernet over MU channel) corresponding to a status signal sent over a second channel. In some embodiments, the announcement message may be sent before a status signal, while in other embodiments, the announcement message may be sent after a status signal. The announcement message may include information identifying a particular fuel car sending the announcement message, for example in a header.

At step 806, a status message may be transmitted. The status message may be transmitted to the fuel car over a particular second channel associated with a particular fuel distribution path from one or more powered vehicles. The fuel distribution path may include one or more of a hose or pipe connecting the fuel car and one or more powered vehicles in fluid communication. As one example, the second channel may be a wire or cable that is physically separate from the first channel. In some embodiments, the second channel may be a wire or cable that is mounted or affixed by or to the fuel distribution path, such as by a clip, a fitting in a flange in the fuel distribution path, or the like. As another example the status message may be transmitted as a pulse or variation in fuel pressure in the particular fuel distribution path. As yet another example, the second channel may be a wire that is not physically separate from the first channel. For example, the first channel may be a channel of a MU line configured for Ethernet over MU communications and the second channel may be a channel of a MU line that is electrically separated at the fuel car and not configured for Ethernet over MU communications.

At step 808, an acknowledgement signal is transmitted. In various embodiments, each powered vehicle that receives the status signal corresponding to the announcement message transmitted at step 806 may respond with an acknowledgement signal. The acknowledgement signal may be transmitted over the first channel, and may include identification information in the header identifying the particular powered vehicle transmitting the acknowledgement signal. In some embodiments, the acknowledgement signal may be include a time stamp identifying a time the acknowledgement was sent.

At step 810, the acknowledgement signal is received at the fuel car. The acknowledgement signal may be analyzed or processed (e.g., by a communication module disposed onboard the fuel car), for example, to extract information from or obtain information related to the acknowledgement signal. For example, identification information corresponding to the sender of the acknowledgement signal may be extracted from the acknowledgement signal. As another example, timing information regarding the time the acknowledgement signal was sent may be extracted from the acknowledgement signal. As yet another example, timing information may be generated using a clock or other timing mechanism to identify a time at which the fuel car received the acknowledgement signal.

At step 812, the source of the acknowledgement signal may be determined. For example, the identity of the source of the acknowledgment signal may be determined using identification information in the acknowledgement signal (e.g., information in a header). In various embodiments, a given status channel (and corresponding fuel distribution path) may be operably connected to more than one powered vehicle, such that plural acknowledgement signals are transmitted from plural vehicles for each status signal sent over the given status channel. In such embodiments, plural acknowledgement signals may be received responsive to the transmission of a single status signal, and each source of an acknowledgement signal may be determined. In some embodiments, the source may be determined based on a side of the fuel car from which the acknowledgement signal is received, instead of being associated with a particular dedicated fuel path.

At step 814, the source of an acknowledgement signal may be associated with a fuel distribution path. For example, each source of an acknowledgement signal indicating receipt of a status signal may be identified and associated with a fuel distribution path corresponding to the status channel over which the status signal was transmitted. For example, each acknowledgement signal received within a given amount of time (or including timing information indicating transmission within a given amount of time) of transmission of a given status signal may be determined to be associated with the fuel distribution path to which the status channel over which the status signal was transmitted corresponds. For instance, in an example scenario, an acknowledgement message identifying vehicle "123" may be received within a predetermined time period over a first channel by a fuel car that sent a status message along a status channel associated with a first fluid distribution path. Subsequently, an acknowledgement message identifying vehicle "456" may be received within a predetermined time period over a first channel by the fuel car after transmission of a status message along a second status channel associated with a second fluid distribution path. The fuel car (e.g., one or more processors disposed onboard the fuel car) may then associate vehicle "123" with the first fuel distribution path, and associate vehicle "456" with the second fuel distribution path. Thus, if a subsequent fuel request identified from vehicle "123" is received, the fuel car may provide fuel via the first fuel distribution path, which the fuel car has associated with vehicle "123."

At step 816, additional information may be transmitted. The additional information may be transmitted over the first channel and be included in a message including identification information specifying the sender and/or intended recipient of the additional information. With the fuel car and one or more powered vehicles now associated with each other and aware of the identity of each other, messages specific to or tailored for a given vehicle (or group of vehicles) may be transmitted. As one example, a fuel request may be sent over the first channel by a powered vehicle and recognized by a fuel car associated with the powered vehicle, with the fuel car supplying fuel to the powered vehicle via an appropriate fuel distribution path responsive to the fuel request. As another example, a status message may be sent from the fuel car (e.g., low on fuel, out of fuel, experiencing a malfunction, no faults detected, or the like) over the first channel and recognized by any vehicles receiving fuel from the fuel car. Additionally or alternatively, status messages from one or more powered vehicles may be transmitted over the first channel and recognized by the fuel car as applying to pertinent vehicles (e.g., vehicles supplied by the fuel car). As yet another example, additional information regarding a powered vehicle and/or the fuel car may transmitted. For instance, a powered vehicle may transmit a message over the first channel that identifies the powered vehicle as the lead vehicle of a consist. The fuel car may then identify the sender as the lead vehicle, and may, for example, provide additional authority or priority for messages received from the lead vehicle relative to other vehicles.

Figure 9:
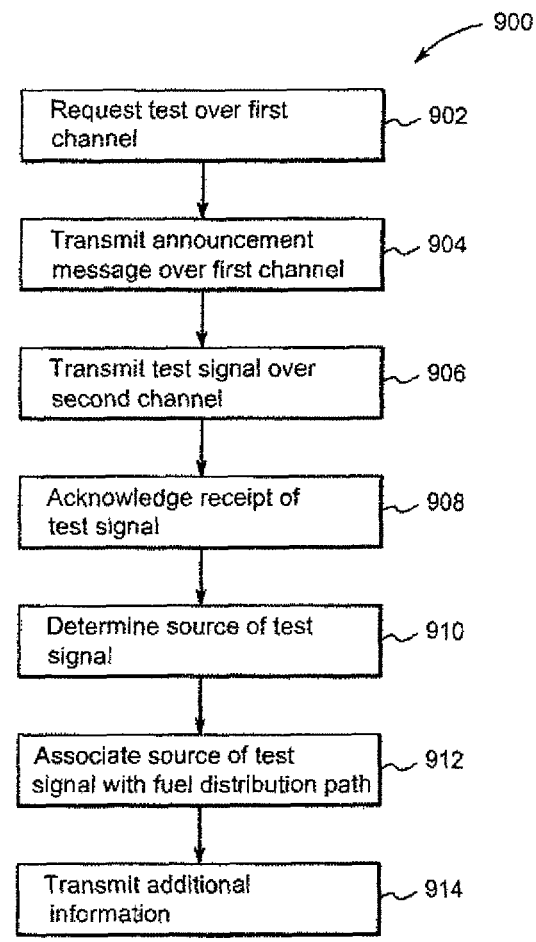
FIG. 9 illustrates a flowchart of a method for associating a fuel car with one or more powered vehicles of a vehicle system in accordance with one embodiment.

FIG. 9 illustrates a flowchart of a method 900 for associating powered vehicles with a fuel vehicle supplying the powered vehicles in accordance with one embodiment. Aspects of this method may be similar in respects to aspects of the method shown in FIG. 8. However, in this method, status signals and announcement messages may be transmitted from one or more powered vehicles, and acknowledgement messages (e.g., messages acknowledging receipt of status signals) may be transmitted from one or more fuel cars. The method may be performed, for example, using certain components, equipment, structures, or other aspects of embodiments discussed above. In certain embodiments, steps may be added or omitted, may be performed simultaneously or concurrently with other steps, may be performed in different order, and/or may be performed more than once, for example, in an iterative fashion. In various embodiments, portions, aspects, and/or variations of the method may be used to direct hardware to perform operations described herein.

At step 902, a request for a status signal from a fuel car may be transmitted over first channel (e.g., a channel configured for Ethernet over MU communications). For example, in various embodiments, a fuel car (e.g., one or more processors disposed onboard the fuel car) may be configured to determine if each fuel distribution path of the fuel car is associated with one or more powered vehicles. If any fuel distribution paths are not associated with one or more powered vehicles, the fuel car may transmit a status message to attempt to identify any powered vehicles that may be supplied by the fuel distribution path or paths not currently identified as associated with one or more powered vehicles. In some embodiments, one or more powered vehicles may be configured to perform a status or transmit a status signal without receiving a request from a fuel car. For example, a status may be performed when one or more of a mission begins, when a mission is stopped, when one or more vehicles are added to or removed from a consist, when a powered vehicle determines that the powered vehicle is not aware of the identity of a fuel car supplying the powered vehicle, or at predetermined time intervals At step 904, an announcement message may be transmitted. In various embodiments, a powered vehicle transmits an announcement message over the first channel (e.g., an Ethernet over MU channel) corresponding to a status signal sent over a second channel. In some embodiments, the announcement message may be sent before a status signal, while in other embodiments, the announcement message may be sent after a status signal. The announcement message may include information identifying the source of the announcement message, for example in the header of the announcement message. The announcement message may include timing information, such as a time stamp indicating the time of sending of the announcement message.

At step 906, a status signal may be transmitted. The status signal may be transmitted from the powered vehicle over a particular second (or status) channel associated with a particular fuel distribution path from which the powered vehicle is supplied by the fuel car. In some embodiments, the fuel distribution path may be unique to the powered vehicle, while in other embodiments at least a portion of the fuel distribution path may be shared by plural powered vehicles. As one example, the second channel may be a wire or cable that is physically separate from the first channel, for instance a wire or cable that is mounted or affixed by or to the fuel distribution path, such as by a clip, a fitting in a flange in the fuel distribution path, or the like. As another example, the second channel may be a wire that is not physically separate from the first channel. For example, the first channel may be a channel of a MU line configured for Ethernet over MU communications and the second channel may be a channel of a MU line that is electrically separated at the fuel car and not configured for Ethernet over MU communications.

At step 908, an acknowledgement message may be transmitted from the fuel car to acknowledge receipt of the status signal. The acknowledgement signal or message may be transmitted over the first channel, and may include identification information in the header identifying the particular fuel car transmitting the acknowledgement signal. In some embodiments, the acknowledgement signal may be include a time stamp identifying a time the acknowledgement was sent. Identification information in the header, for example, may be used by a powered vehicle to associate the identified fuel car with a corresponding status message and/or fuel distribution path.

At step 910, the source of the status signal may be determined. For example, based upon the relative times of transmission of an announcement message identifying the powered vehicle and the transmission of the status message, the fuel car may identify the powered vehicle. The identity of the source of the announcement signal may be determined using identification information in the announcement signal (e.g., information in a header).

At step 912, the source of the status signal may be associated with a fuel distribution path. For example, based upon the relative times of transmission of an announcement message identifying the powered vehicle and the transmission of the status message, the fuel car and/or the powered vehicles may identify the powered vehicle and associate the powered vehicle (that sent the announcement and status messages) with a fuel distribution path corresponding to the status channel over which the status message or signal was sent. In various embodiments, a given status channel (and corresponding fuel distribution path) may be operably connected to more than one powered vehicle. In such embodiments, plural announcement and status signals may be transmitted at different times, and each source of separate status signals sent at different times over the same status channel may be determined.

At step 914, additional information may be transmitted. With a fuel car and one or more powered vehicles associated with each other, messages specific to or tailored for a given vehicle (or group of vehicles) may be transmitted. As one example, a fuel request or a status message may be sent over the first channel by a powered vehicle. As another example, additional information regarding a powered vehicle and/or the fuel car may transmitted. For instance, a powered vehicle may transmit a message over the first channel that identifies the powered vehicle as the lead vehicle of a consist. As still one more example, additional information transmitted may correspond to a valve setting or other control of a fuel distribution path. In various embodiments, a powered vehicle may be associated with a particular fuel distribution path shared by plural powered vehicles, and may transmit additional information conveying a valve setting that will route fuel to an appropriate branch unique to the particular powered vehicle. With the additional information transmitted over the first channel, the fuel car and/or other powered vehicles (e.g., vehicles on different branches of the shared fuel distribution path) may receive the message, associate the transmitted valve setting with supply of the particular powered vehicle, and control the fuel distribution path appropriately so that fuel is dispersed along the proper branch when it is desired to supply the particular powered vehicle.

Embodiments may also include computer readable media with instructions that are configured to direct a processor to execute or perform the various method operations described herein. Embodiments may also include powered vehicles including the various modules and/or components or vehicle networks described herein. Moreover, embodiments described herein may include vehicle consists that include the various modules and/or components, the vehicle networks, or the system networks described herein.

In one embodiment, a system (e.g., a system in a vehicle consist including at least a fuel car operably connectable to a powered vehicle in a fuel distribution path) is provided that includes a communication module and a determination module. The communication module is configured to communicate via a first channel and a second channel. The second channel is associated with the fuel distribution path and is configured to communicate a status signal. The determination module is configured to associate the fuel distribution path with the powered vehicle based at least in part on at least one of the status signal or an acknowledgment message indicating receipt of the status signal.

In another aspect, the fuel distribution path is one of plural fuel distribution paths operatively connecting the fuel car to a corresponding plurality of powered vehicles, and the determination module is configured to identify, for a particular fuel distribution path of the plural fuel distribution paths, a corresponding particular powered vehicle of the plurality of powered vehicles. In another aspect, the communication module is configured to communicate with plural additional powered vehicles in the vehicle consist, and one or more messages transmitted by a given vehicle over the first channel is received by another of the additional powered vehicles operably connected to the first channel. Each of the plural additional powered vehicles includes a respective fuel distribution path, and the communication module is further configured to communicate via the second channel a respective status signal for each of the respective fuel distribution paths for each of the additional powered vehicles. The determination module is configured to determine which powered vehicle is associated with which fuel distribution path from the fuel car to the respective one of the additional powered vehicles using the respective status signals.

In another aspect, the second channel includes a discrete line configured to communicably couple the fuel car with at least one powered vehicle to which the fuel car is configured to provide fuel. In another aspect, the system further includes a multiple unit (MU) cable coupling the fuel car and the powered vehicle, wherein the first channel comprises an MU line configured for Ethernet over MU communication. In some embodiments, the MU cable includes plural lines, and the first channel and the second channel are on electrically separate lines in the MU cable.

In another aspect, the communication module is configured to initiate transmission of pressure pulse along at least portion of the fuel distribution path. In another aspect, the determination module is configured to associate at least one additional vehicle with at least one additional fuel distribution path. In another aspect, the determination module is configured to use the status signal to determine a direction or orientation of the fuel car relative to the powered vehicle.

In an embodiment, a method for a system having a first channel configured to transmit data and a second channel associated with a fuel distribution path from a fuel car to a powered vehicle that is operative coupled to the fuel car is provided. The method includes transmitting a status signal over the second channel and associating the fuel distribution path with the powered vehicle and the fuel car using the status signal. In another aspect, transmitting the status signal includes transforming the status signal to create a data form that is amenable to transmit through a multiple unit cable. In another aspect, the method includes determining at least one of a source of the status signal or a source of an acknowledgement message transmitted responsive to the status signal. In another aspect, the method includes determining a direction or orientation of the powered vehicle relative to the fuel car based at least one on of the status signal or an acknowledgment signal received in response to the status signal. In another aspect, transmitting the status signal includes transmitting a pressure pulse through the fuel distribution path.

In another aspect, the method includes transmitting an announcement message over the first channel. The announcement message is communicated between the fuel car and at least the powered vehicle. The powered vehicle is at least one of plural powered vehicles of a vehicle consist including the fuel car. In another aspect, the fuel distribution path is one of a plurality of fuel distribution paths, and the method further includes identifying, for each particular fuel distribution path of the plural fuel distribution paths, a corresponding powered vehicle of a plurality of powered vehicles. In some embodiments, the method further includes controlling, via the first channel, one or more valves disposed in at least one of the plurality of fuel distribution paths and thereby controlling which of the plurality of powered vehicles receives fuel from the fuel car. In another aspect, the method includes transmitting operational data associated with the powered vehicle over the first channel. In some embodiments, the powered vehicle is one of plurality of powered vehicles, and the method further includes form a network including processors disposed on one or more of the plurality powered vehicles, and transmitting the data via the first channel over the network.

In an embodiment, a controller is configured to direct one or more processors to transmit an announcement message over a first channel. The announcement message is communicated between a fuel car of a vehicle consist and plural additional vehicles of the vehicle consist. The announcement message is configured to announce a status signal. The first channel is configured for communications with the plural additional vehicles and the fuel car. One or more messages transmitted by a given vehicle over the first channel is received by each other vehicle operably connected to the first channel. The controller is also configured to direct the one or more processors to transmit the status signal over a second channel. The second channel is associated with at least one fuel distribution path from the fuel car. The controller is also configured to direct the one or more processors to determine at least one of a source of the status signal or a source of an acknowledgement message transmitted responsive to the status signal. Also, the controller is configured to direct the one or more processors to associate the at least one fuel distribution path associated with the second channel with the at least one of the source of the status signal or the source of the acknowledgement message.

In various embodiments, a first communication module may communicate first information with a second communication module over a first communication path and second information with the second communication module over a second communication path. In any such embodiments, it may be the case that the second communication path may not transmit the second information as initially received by the first communication module, and therefore, the first communication module may convert the second information, as initially received, into different signals that are amenable for transmission over the second communication path. For example, the second information may be received by the first communication module over a third communication path, such as a network cable or bus, in a first format and at a first transmission rate/bandwidth. The second communication path, due to its electro-mechanical properties, is not capable of carrying the second information in the first format at the first transmission rate/bandwidth. However, the first communication module may convert the second information, from the first format into a different, second format (the modulated signals), which is compatible with the second communication path at the first transmission rate/bandwidth. In one specific example, the second communication path is an MU line. The second information, comprising network data, is received by the first communication module at a high bandwidth rate (average rates of 10 Mbit/sec or greater) over a CAT-5E or similar cable, in a first format for transmission of the second information over the CAT-5E cable at the high bandwidth rate. The MU line, based on the properties of the wires that comprise the MU line, may not be capable of carrying the second information, at the first format, at the high bandwidth rate. Thus, the first communication module converts the second information, from the first format, into modulated signals at a second format, which the MU line is capable of carrying at the high bandwidth rate. Recipient communication modules (e.g., the second communication module) may be configured to convert the received modulated signals back into the first format.

In another embodiment, a system comprises a communication module that may be disposed on-board at least one of a powered vehicle or a fuel car (fuel tender) of a rail vehicle consist. The fuel car may be operably connected to and to provide fuel to at least one locomotive of the rail vehicle consist. The communication module may communicate via a first channel configured for communications with plural additional rail vehicles including the at least one locomotive of the rail vehicle consist. One or more messages transmitted by a given rail vehicle over the first channel is received by each other rail vehicle operably connected to the first channel. The communication module is configured to communicate via a second channel associated with at least one fuel distribution path from the fuel car. The first channel may transmit at least one of an announcement message to announce a status signal or an acknowledgement message to acknowledge receipt of the status signal. The second channel may transmit the status signal. The system may include a determination module to associate at least one of the plural additional rail vehicles with at least one fuel distribution path based on a source or a recipient of the status signal or the acknowledgement message. The first channel may be a channel over an MU line or other train line (electrical conductor interconnecting rail vehicles). The second channel may be one of the fuel distribution paths.

Various components and modules described herein may be implemented as part of one or more computers, computing systems, or processors. The computer, computing system, or processor may include a microprocessor. The microprocessor may be connected to a communication bus. The computer or processor may also include a memory. The memory may include Random Access Memory (RAM) and Read Only Memory (ROM). The computer or processor further may include a storage system or device, which may be a hard disk drive or a removable storage drive such as a floppy or other removable disk drive, optical disk drive, and the like. The storage system may also be other similar means for loading computer programs or other instructions into the computer or processor. The instructions may be stored on a tangible and/or non-transitory computer readable storage medium coupled to one or more servers. As used herein, the term "computer" or "computing system" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer" or "computing system."

The set of instructions or modules may include various commands that instruct the controller, computer or processor as a processing machine to transform information and/or perform specific operations such as the methods and processes described herein. The set of instructions may be in the form of a software program. The software may be in the form of a collection of separate programs, a program module within a larger program or a portion of a program module. An example of modular programming may be in the form of object-oriented programming. The processing of input data by the processing machine may be in response to user commands, or in response to results of previous processing, or in response to a request made by another processing machine.

This written description uses examples to disclose the invention and to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

The invention claimed is:

1. A system, in a vehicle consist comprising at least a fuel car operably connectable to a powered vehicle via a fuel distribution path, the system comprising:
   a communication module configured to communicate via a first channel and a second channel, wherein the second channel is associated with the fuel distribution path and is configured to communicate a status signal; and
   a determination module configured to associate the fuel distribution path with the powered vehicle based at least in part on at least one of the status signal or an acknowledgement message indicating receipt of the status signal, wherein the fuel distribution path is one of plural fuel distribution paths operatively connecting the fuel car to a corresponding plurality of powered vehicles, and the determination module is configured to identify, for a particular fuel distribution path of the plural fuel distribution paths, a corresponding particular powered vehicle of the plurality of powered vehicles.

2. The system of claim 1, wherein the communication module is configured to communicate with plural additional powered vehicles in the vehicle consist, and one or more messages transmitted by a given vehicle over the first channel is received by another of the additional powered vehicles operably connected to the first channel, each of the plural additional powered vehicles having a respective fuel distribution path, and the communication module is further configured to communicate via the second channel a respective status signal for each of the respective fuel distribution paths for each of the additional powered vehicles, and the determination module is configured to determine which powered vehicle is associated with which fuel distribution path from the fuel car to the respective one of the additional powered vehicles using the respective status signals.

3. The system of claim 1, wherein the second channel comprises a discrete line configured to communicably couple the fuel car with at least one powered vehicle to which the fuel car is configured to provide fuel.

4. The system of claim 1, further comprising a multiple unit (MU) cable coupling the fuel car and the powered vehicle, wherein the first channel comprises an MU line configured for Ethernet over MU communication.

5. The system of claim 4, wherein the MU cable comprises plural lines, and the first channel and the second channel are on electronically separate lines in the MU cable.

6. The system of claim 1, wherein the communication module is configured to initiate transmission of a pressure pulse along at least a portion of the fuel distribution path.

7. The system of claim 1, wherein the determination module is configured to associate at least one additional vehicle with at least one additional fuel distribution path.

8. The system of claim 1, wherein the determination module is configured to use the status signal to determine a direction orientation of the fuel car relative to the powered vehicle.

9. A controller, for a vehicle consist comprising at least a fuel car operably connectable to a plurality of powered vehicles via plural respective fuel distribution paths, the controller comprising:
   a communication module configured to:
   transmit an announcement message over a first channel, the announcement message communicated between the fuel car of the vehicle consist and plural additional vehicles of the vehicle consist, the announcement message configured to announce a status signal, the first channel configured for communications with the plural additional vehicles and the fuel car, wherein one or more messages transmitted by a given vehicle over the first channel is received by each other vehicle operably connected to the first channel; and
   transmit the status signal over a second channel, the second channel associated with at least one of the plural fuel distribution paths from the fuel car; and
   a determination module configured to:
   determine at least one of a source of the status signal or a source of an acknowledgement message transmitted responsive to the status signal; and
   associate the at least one of the plural fuel distribution paths associated with the second channel with the at least one of the source of the status signal or the source of the acknowledgment message, wherein the determination module is configured to identify, for a particular fuel distribution path of the plural fuel distribution paths, a corresponding particular powered vehicle of the plurality of powered vehicles.

10. A system, in a vehicle consist comprising at least a fuel car operably connectable to a powered vehicle via a fuel distribution path, the system comprising:
    a communication module configured to communicate via a first channel and a second channel, wherein the second channel is associated with the fuel distribution path and is configured to communicate a status signal; and
    a determination module configured to associate the fuel distribution path with the powered vehicle based at least in part on at least one of the status signal or an acknowledgement message indicating receipt of the status signal, wherein the communication module is configured to communicate with plural additional powered vehicles in the vehicle consist, and one or more messages transmitted by a given vehicle over the first channel is received by another of the additional powered vehicles operably connected to the first channel, each of the plural additional powered vehicles having a respective fuel distribution path, and the communication module is further configured to communicate via the second channel a respective status signal for each of the respective fuel distribution paths for each of the additional powered vehicles, and the determination module is configured to determine which powered vehicle is associated with which fuel distribution path from the fuel car to the respective one of the additional powered vehicles using the respective status signals.

* * * * *